(12) United States Patent
Kim

(10) Patent No.: US 9,302,568 B2
(45) Date of Patent: Apr. 5, 2016

(54) SUN TRACKING TINT VISOR

(71) Applicant: Philos Kim, Wanaque, NJ (US)

(72) Inventor: Philos Kim, Wanaque, NJ (US)

(73) Assignee: Grey Matter Fusion, Inc., Wanaque, NJ (US)

( * ) Notice: Subject to any disclaimer, the term of this patent is extended or adjusted under 35 U.S.C. 154(b) by 0 days.

(21) Appl. No.: 14/310,750

(22) Filed: Jun. 20, 2014

(65) Prior Publication Data

US 2015/0367713 A1    Dec. 24, 2015

(51) Int. Cl.
*B60J 3/04* (2006.01)
*B60J 3/02* (2006.01)

(52) U.S. Cl.
CPC . *B60J 3/04* (2013.01); *B60J 3/0239* (2013.01)

(58) Field of Classification Search
CPC .......... B60J 3/04; B60J 3/06; B60J 3/00; B60J 3/0278; B60J 3/07; B60J 3/02; B60J 3/0204; B60J 3/0208; B60J 3/0213; B60J 3/2017; B60J 3/023; B60J 3/0234; B60J 3/0239; B60J 3/0252; B60J 3/0256; B60J 3/026
USPC .............. 296/97.4, 97.7, 97.9, 97.11, 97.2
See application file for complete search history.

(56) References Cited

U.S. PATENT DOCUMENTS

| | | | | |
|---|---|---|---|---|
| 1,746,334 A * | 2/1930 | Bollesen | ...................... | 296/97.2 |
| 1,795,184 A * | 3/1931 | Smith | ...................... | 248/289.11 |
| 1,941,032 A * | 12/1933 | Knowles | ...................... | 248/276.1 |
| 2,511,590 A * | 6/1950 | Keck | ...................... | 359/613 |
| 4,003,597 A | 1/1977 | Acuff | | |
| 4,090,732 A | 5/1978 | Vistitsky | | |
| 5,472,255 A | 12/1995 | Moor | | |
| 5,513,892 A * | 5/1996 | Thomas | ...................... | 296/97.2 |
| 5,842,748 A | 12/1998 | Cummins | | |
| 5,851,046 A | 12/1998 | Kalkman et al. | | |
| 5,855,405 A | 1/1999 | Robles | | |
| 6,086,132 A | 7/2000 | Larson et al. | | |
| RE37,068 E * | 2/2001 | Beatty | ...................... | 296/97.1 |
| D452,208 S | 12/2001 | Headrick | | |
| 7,540,553 B1 | 6/2009 | Mullis | | |
| 7,686,374 B1 * | 3/2010 | Marszalek | ...................... | 296/97.7 |
| 2004/0119313 A1 * | 6/2004 | Naik | ...................... | 296/97.2 |

(Continued)

FOREIGN PATENT DOCUMENTS

DE     3436760     2/1986
DE     102005025089   12/2005

(Continued)

OTHER PUBLICATIONS

PCT Invitation to Pay Additional Fees mailed Aug. 31, 2015.

(Continued)

*Primary Examiner* — Dennis H Pedder
(74) *Attorney, Agent, or Firm* — Rocky Mountain Patent, LLC

(57) ABSTRACT

A light filtering transparent or semitransparent visor intended to prevent flash blindness and other hazards associated with the adverse affects associated with bright lights impacting the eyesight of occupants of a vehicle. In the preferred embodiment of the invention, the visor comprises a larger, tinted body surrounding a smaller, much more heavily tinted body intended to filter the bright rays of sun to enable safe viewing of the sun through the filter. The entire apparatus is designed to be repositioned directly in the line of sight between the viewer and the sun in the preferred embodiment of the invention.

4 Claims, 16 Drawing Sheets

(56) References Cited

U.S. PATENT DOCUMENTS

2007/0210604 A1* 9/2007 Lin .............................. 296/97.2
2011/0261430 A1* 10/2011 Mazurkiewicz et al. ..... 359/273

FOREIGN PATENT DOCUMENTS

| GB | 340726 | * | 1/1931 |
| GB | 869441 | * | 5/1961 |
| JP | 10278661 | A1 | 10/1996 |
| JP | 2009298393 | A | 6/2008 |
| JP | 201312745 | A1 | 10/2013 |
| WO | WO9854020 | A2 | 12/1998 |
| WO | WO9919159 | A1 | 4/1999 |

OTHER PUBLICATIONS

PCT International Search Report mailed Nov. 23, 2015.

* cited by examiner

SUN TRACKING TINT VISOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Safe operation of a vehicle requires a clear, unimpaired view out of the vehicle. Bright rays of sunshine encountered on the road can distract drivers, even potentially temporarily blinding them. Poor visibility caused by sunshine can lead to loss of control of the vehicle, impact and subsequent damage to the vehicle and injury or death of drivers, passengers, or onlookers. Sunshine faced while occupying a vehicle can cause pain or irritation to the eyes of occupants of a vehicle, or potential long-term damage to eyesight.

Traditional visors in the prior art (DE102005025089A1, DE 3436760C1) are rectangular devices that are installed in vehicles, usually during the process of manufacturing the vehicle. Such visors block the sunshine encountered on a roadway from directly striking the eyes of occupants of the vehicle. Typical traditional visors swing down from the ceiling of the vehicle and occupy the top portion of a person's field of view. Such devices are generally opaque. In typical cases, they cover an area at the top of the windshield in a rectangle that is about a foot wide by 6 inches tall.

A major problem associated with opaque visors known in the prior art is that they obstruct the view of the occupants of a vehicle, and most critically, the driver of a vehicle. When an opaque visor is deployed, the user of said opaque visor's field of view is reduced by the area covered by the visor, and his or her capacity to see and respond to obstacles or hazards outside of the vehicle is necessarily reduced. Users can "peek" around the visor to observe said obstacles or hazards, but if the user by chance looks directly at the sun, "peeking" may lead to momentary flash blindness caused by bright sunshine. The problem of the hazards associated with peeking is exacerbated by the opaque visors known in the prior art, as the user of such devices do not know where the sun may enter into their line of sight from behind the visor. As such, such a user may peek around an opaque visor only to suddenly and unintentionally look directly into the sun. The flash blindness caused by such an action could prove catastrophic for the operator of a vehicle. As a result of such flash blindness, a vehicle operator could wreck the vehicle, damage exterior objects, or worse potentially cause injury or death to individuals either outside of the vehicle or occupants of the vehicle.

Flash blindness and/or a bright sun are also problematic for general driving. Sun glare—the very bright shine associated with the sun during certain times of the day, weather conditions, climates, and/or seasons—can have adverse effects on the driver. There are numerous reports of traffic accidents solely or partly attributed to glare associated with the sun and related light reflected from various reflective surfaces. Obvious consequences of traffic accidents on the persons affected by said accident include injury or death, economic loss associated with said injury, death, or on vehicles and property, and emotional and psychological trauma that may or may not be quantified. In addition to the effect on persons, there are numerous economic impacts. Traffic due to the sun glare, or associated with accidents due to sun glare can have substantial impact on the economy. Traffic can increase commute time, increase air pollution, and decrease productivity. Finally, dealing with sun glare may cause fatigue in individuals in a vehicle, especially the driver, during exposure to the sun light and/or associated traffic.

The scope of sunshine protection offered by prior art visors is limited in a number of ways. Sunshine reflected off the ground or other vehicles, enter the vehicle operator's line of sight from below the viewable area protected by a traditional visor. Thus, such reflected light can easily cause distractions to vehicle occupants as does direct rays of light from the sun. Prior art visors can also be problematic for some people of certain sizes and for some configurations of internal vehicular seating in relation to a windshield. For instance, many current visors block direct or reflected sunshine for users of average or above average stature. However, in some cases, prior art visors may not be effective for users of below average stature, due to the location and angle of the sunshine relative to their eye level, for example, when the sun is near the horizon. Many devices have been developed in attempts to overcome this problem. Prior art visor add-ons attach to opaque visors and act as a mechanism to extend the scope of area protected by the visors. Some of these auxiliary visor attachments are made of a tinted material, some are made of a polarized material, and still others are opaque, or incorporate patterns or shapes designed to deflect sunshine. Prior art visors may also not be ideal for users of above average stature, as current opaque visors may obstruct and reduce visibility of the road for said users of above average stature.

Moreover, prior art visors may work well only for certain configurations of vehicular seating in relation to a windshield. If a seat is too far away from or too close to a windshield, the angle of the sunshine entering into a car, whether direct or reflected, prevents many traditional prior art visors from offering adequate sunshine protection in such instances. In such cases, sunshine can enter into the line of sight of a vehicle occupant by traveling around a fully deployed prior art visor.

In addition, prior art devices, such as auxiliary visor attachments, can be used with traditional visors. Such devices, however, have their own disadvantages. Prior art devices often may only be used with the traditional visor only in the lowered or partially lowered positions. Even when prior art devices can be used independently of the position of traditional visors, they suffer the same issue of the inability to track the sun's movement. Moreover, while many such prior art devices attempt to solve the problem of visibility by incorporating a tint, the tint is inadequate. A primary problem associated with many tint-incorporating transparent or semi-transparent visors known in the prior art is that the tint utilized by such visors does not adequately reduce intensity of sunlight. As such, if a driver intentionally or unintentionally looks through a prior art visor incorporating such low tint levels directly into the sun, the driver would experience flash blindness causing the risk of harm or death to either the driver, occupants of the vehicle, or individuals outside of the vehicle.

SUMMARY OF THE INVENTION

This invention relates to a sunlight mitigating apparatus found inside a vehicle. The preferred embodiment of the invention incorporates a tinted filter with a more strongly tinted strip portion tinted to the approximate darkness of a welding shield that blocks the direct sun's rays from entering into the eyes of a vehicle occupant, primarily the driver. The invention further comprises a positioning system inside of a vehicle. The positioning system enables the user may adjust the device if the sun continues to move relative to the user.

At the heart of the preferred embodiment of the invention is a piece of light-transmissible, transparent material wider than it is tall, further comprising a strongly tinted strip portion. In such embodiment, the strongly tinted strip portion is nearly as wide as the more fully light transmissible, transparent material, but much less tall. Said strongly tinted strip portion is also light-transmissible and transparent, although with the approximate darkness of a welding shield. The strongly tinted portion is designed to greatly reduce sunshine from entering the vehicle occupants' eyes (especially the driver's), thus limiting said sun's direct rays from distracting or causing severe impairment to a vehicle's occupants. In an alternative embodiment of the invention, the surrounding light-transmissible tinted filter piece is strongly tinted to block a large amount of light, but lacks the tinting of the super dark tinted strip portion.

A novel aspect of the invention is the incorporation of more than one tinted region, wherein a more strongly tinted strip portion conforms to American National Standards Institute (ANSI) values corresponding to heavy levels of tinting normally associated with the tinting utilized in welding shields. In the preferred embodiment of the invention, by incorporating a tint that conforms to ANSI standards of tint levels associated with eye protection utilized during welding activities, wherein a small amount of light can pass through the strongly tinted strip portion, the user can more readily readjusted the more strongly tinted strip portion directly in the line of sight between the eyes of the user to the sun to block the sun's direct rays from directly entering into the user's eyes.

The preferred embodiment of the invention, while never fully opaque, is not only light transmissible, but is also transparent or semi-transparent, to enable the user to continuously observe the surroundings without an obstructed view. The preferred embodiment of the invention also incorporates transparent materials of varying tint level to ensure that an optimal level of luminous transmittance is preserved. Thus, in the preferred embodiment of the invention, the major problem of obstructed forward view associated with opaque visors known in the prior art is solved by preserving a level of transparency to enable a user to maintain a more complete field of view while still dramatically reducing the effects of Flash Blindness and other distractions caused by sunlight. The preferred embodiment of the present invention, therefore, enables its user to simultaneously block dangerous levels of brightness from the sun, track the sun's position, and also maintain spatial awareness of the surroundings of the vehicle through a lesser tinted area, while solving a number of problems associated with related prior art inventions, in a manner that allows for balance between the need to maintain a full field of forward vision, with the need to minimize the distraction and risk caused by sunlight.

NUMERICAL REFERENCES UTILIZED IN THE DRAWINGS

Figure 1:
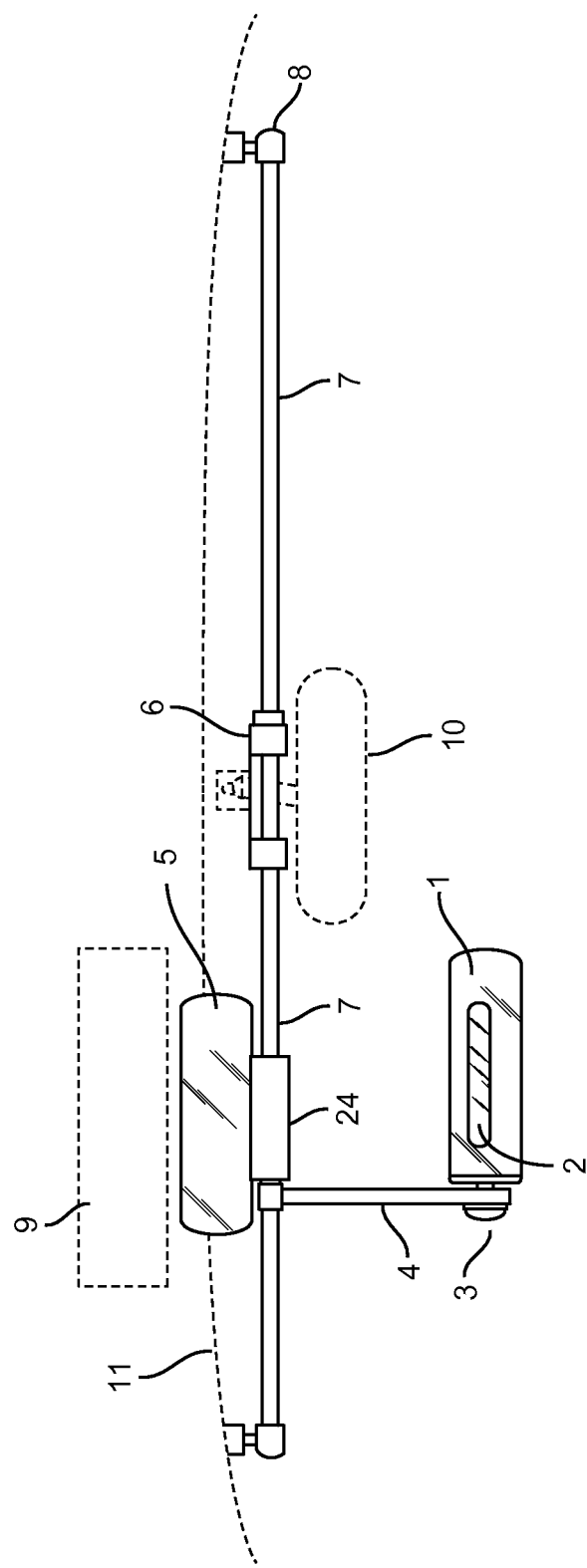
FIG. 1: View of the preferred embodiment of the invention from a vehicle occupant's perspective.

1. Optical Filter Embodiment
2. Darker Tint Strip Embodiment
3. Optical Filter adjustment Embodiment
4. Track Arm Embodiment
5. Auxiliary Darker Visor Embodiment
6. Mirror Mount Support Rod Locking Knob Embodiment
7. Track Rod Embodiment
8. Track Rod Vehicle Mount Embodiment
9. Conventional Upper-Auxillary Sun Visor known in the prior art
10. Rear-view Mirror known in the prior art
11. Vehicle Roofline known in the prior art
12. Sun
13a. A representative incident ray of light from the Sun
13b. A representative incident ray of light from the Sun filtered by the Darker Tint Strip
14a. A representative reflected ray of light from a surface
14b. A representative reflected ray of light from a surface filtered by the Optical Filter 15. Side-view of the Optical Filter and Darker Tint Strip Assembly Embodiment
16a. A representative reflected ray of light from a highly-reflective surface
16b. A representative reflected ray of light from a highly-reflective surface filtered by the Darker Tint Strip
17. User of below-average stature
18. Auxiliary Optical Filter and Darker Tint Strip Embodiment
19. Auxiliary Optical Filter Mount
20. Dashboard known in the prior art
21. Steering Wheel known in the prior art
22. Darker Tint Strip embodiment for use in a helmet
23. Helmet known in the prior art
24. Sliding Carriage Box embodiment
25. A-Pillar known in the prior art
26. Cross-sectional representation of a passenger vehicle known in the prior art
27. Cross-sectional view of an embodiment of the Sliding Carriage Box
28. Cross-sectional view of an embodiment of the Track Rod
29. Cross-sectional view of the Optical Filter Embodiment
30. Cross-sectional view of the Darker Tint Strip Embodiment
31. Cross-sectional view of the Optical Filter and Darker Tint Strip Assembly Embodiment
32. Sliding Carriage Box Clamp Assembly Embodiment
33. Sliding Carriage Box Clamp Fastener Embodiment
34. Sliding Carriage Box Track Rod Securement Plate Embodiment
35. Sliding Carriage Box Track Arm Bearing Embodiment
36. Sliding Carriage Box Track Arm Fastener Embodiment
37. Traffic Light known in the prior art
38. Slide Carriage Box Spindle Embodiment
39. Track Arm Telescoping Assembly Embodiment

DETAILED DESCRIPTION

Sunshine can pose a dangerous hazard to vehicle operators. However, prior art opaque visors designed to solve the problem caused by sunshine-related hazards also create equally dangerous hazards by severely limiting the field of view of vehicle operators. These problems remain prevalent in most locations within the United States especially as the sun rises in the early morning above the horizon, and again later as dusk approaches and as the sun sets. During both periods, the sun appears low in the sky, causing a major hazard to drivers who must pay attention to the road even though the sun is low in the sky, directly in such drivers' field of vision.

Sunshine, when originating from the sun sitting low in the sky, can completely blind a driver during direct sun exposure. The light can cause a residual blindness after the initial interaction for up to a few minutes. This temporary blindness is called "Flash Blindness." The condition, a normal reaction to bright light, is caused by a fatigue of the sensors in the eye that detect light. When a driver's eyes fail to enable the driver to see the road ahead, numerous hazards and dangers are presented to objects and potentially people in the direction of travel, and likewise to occupants of the driver's vehicle and other vehicles.

Anyone whose sight has been compromised with any level of Flash Blindness is temporarily impaired in their ability to see. When bright sun blinds a driver of a vehicle, said driver's temporary inability to clearly see the road becomes hazardous. A blinded driver may drive into another lane, into oncoming traffic, into other vehicles, or into people, pets, wildlife or other objects, causing a wide variety of potential harms. This loss of vehicle control can cause a dangerous accident that would be otherwise preventable.

Besides the associated hazards and dangers, Flash Blindness is uncomfortable, and affects vehicle passengers other than the driver. The associated temporary loss of vision disorients passengers. The associated intense light can cause the sensation of pain. Although a passenger may not require clear vision to maintain the safety of the vehicle, Flash Blindness nonetheless remains an undesirable experience for a passenger to endure.

The prevalent preventative solution to the problem of Flash Blindness known in the prior art simply as a "visor" is potentially just as problematic as the effects on a driver associated with Flash Blindness. Such prior art devices block sunshine by placing an opaque body in front of the windshield directly between the driver's eyes and the sun. Often, in particular when the sun is low in the sky, such an opaque visor creates additional hazards by limiting a vehicle operator's sight lines, preventing the vehicle operator to see objects in or near the path of travel. Such devices often prevent a vehicle operator from maintaining a broad field of view outside of the vehicle. Commonly known prior art visors block most of the field of vision available to a vehicle operator. By blocking the field of vision in whole or in part, a traditional visor known in the prior art may prevent a vehicle operator to see obstacles and hazards encountered during vehicle operation.

Moreover, visors known in the prior art incorporate a number of other suboptimal features. For instance, prior art visors generally do not protect drivers of below-average stature from sunshine in the morning or in the evening. During these periods of the day, the sun appears close to the horizon. Unfortunately, it is precisely during these periods when visors known in the prior art are most likely to fail to protect drivers of below-average stature from Flash Blindness caused by bright sunlight. During these periods, when a driver's path takes the driver generally in the direction of the sun, the sun may appear within the field of vision the driver must focus on to safely operate the vehicle.

The distraction caused by bright sunlight during these periods potentially represents a serious problem because a significant number of cars are on the road during these times, which typically fall around or during "rush hour" periods. "Rush hour," as is commonly known in America, refers to the high-traffic periods on roadways across America and around the globe that occur in the morning and in the evening as commuters drive cars to travel to and from work. When traffic is heaviest, accidents are more likely to occur. When accidents do occur during such periods, they are more likely to impact a large number of people. Hence, the bright sunlight emanating from the sun presents a major distraction. Prior art visors fail in such circumstances because they require a user to block the vast majority of the user's field of view to block the sun.

If a user of traditional prior art opaque visors chooses not to position such a device to block the majority of the field of view during such early morning or late afternoon periods when traveling in the general direction of the sun, the bright sunlight is likely to travel under, or around the sides of the visor, directly into the user's eyes, causing Flash Blindness or other distraction. Opaque prior art visors do not employ multiple tint or transparency levels to enable a user to track the position of the sun. In other words, users of said opaque prior art visors do not know where the sun is positioned to effectively block the direct rays of the sun with the prior art visor, and therefore may be exposed to Flash Blindness unexpectedly. Such a scenario poses a serious problem, which has been left to the present inventor to solve with the preferred embodiment of the present invention.

Some visor extenders known in the prior art have been designed to incorporate lightly tinted materials. Some such prior art visors include the addition of a movable opaque piece that blocks the sun. Such visor extenders incorporating opaque pieces do not solve the problems associated with a user's loss of awareness of the position of the sun behind the visor. The preferred embodiment of the present invention, in contrast, employs a super-darkened tint area that allows a very small amount of light to travel through, so the user can reposition the super-darkened tint area directly over the sun while knowing where the sun is in relation to the preferred embodiment of the present invention.

An alternative, yet suboptimal, prior art solution to the problems associated with sunlight during vehicular operations exists in the form of visor-extenders. Many auxiliary visor-extending inventions exist in the prior art and currently are available for purchase (WO 1998054020 A2). In general, these products attach to an existing visor and physically extend beyond the reach of the original visor. Visor-extenders increase the light protection coverage area of existing visors. Such visor-extenders are made of various materials that may be completely opaque, tinted, dark, or even a light-transmissible polarized material.

However, a major problem associated with such prior art visor extenders as described in the preceding paragraph is that those and other similar devices do not enable a user to track the position of the sun behind the opaque portions of a prior art visor. Thus, the user of such devices cannot track the location of the sun behind the visor. Further, another problem with many such prior art visor extenders is that they are opaque, and can block the driver's view. In such cases, the solution can potentially cause similar or worse hazards and dangers as sunshine. Some examples of these prior art visor extenders are fitted with panels that can extend out the horizontal sides of the main bodies of other commonly known prior art opaque visors. While these prior art visor extenders can create a larger area of protection from side to side, such prior art side extenders do little to solve the problems associated with sunlight distracting a vehicle's occupant when the sun is low in the sky, especially during early morning or late afternoon periods. Moreover, such prior art visor extenders, when fully opaque, also exacerbate the problem of field of view obstruction by expanding the total area of the field of view blocked by the opaque visor.

At the heart of the invention is a device that will be referred to herein as a "Sun-Tracking Tint Visor." The preferred embodiment of the present invention addresses the problem of not knowing where the sun is behind the visor. It does so, generally, by incorporating multiple levels of tinting, including tinting dark enough to lessen the brightness of a bright light source, said light source in general relating to sunlight, to make direct viewing of the sun safe. "Sunlight" or "Sun" referred to herein is a bright source of light such as from the Sun. However, "Sunlight" or "Sun" can also refer to bright sources of light other than the sun, including but not limited to construction work lights, and vehicle headlights. The larger tinted transparent material comprised of a moderate to strong level of tinting enclosing the more strongly tinted strip portion in the preferred embodiment of the invention is herein referred to as an "Optical Filter" 1. The smaller more strongly tinted strip portion is herein referred to as the "Darker Tint Strip" 2. The portion of the Sun-Tracking Tint Visor that filters incoming light is illustrated in the embodiment in FIG. 5.

The preferred embodiment of the present invention comprises mechanisms for both vertical and horizontal movement to enable positioning of said embodiment by its user directly between said user's line of sight and the sun. In the preferred embodiment of the invention, as illustrated in FIG. 1, the Sun-Tracking Tint Visor connects to the interior of a vehicle. The Sun Tracking Tint Visor connects to the interior of a vehicle in a number of ways, including to the windshield or via attachment to the metal chassis of the roofline 11.

In an embodiment of the invention intended to be built into a vehicles during the process of manufacturing said vehicle, the preferred method of mounting is mounting directly into the metal chassis of the roofline 11. In an embodiment of the invention intended to be incorporated into a vehicle after production as an aftermarket addition, the preferred method of mounting is directly to the windshield and mirror stem. The attachment points and attachment body enable the Sun-Tracking Tint Visor to moved freely in relation to the windshield, enabling the Sun-Tracking Tint Visor to prevent sunlight from reaching an occupant unimpeded from virtually all regions of the windshield and side front window. In this way, the Sun-Tracking Tint Visor can address the need to block light emanating a wide array of sun locations while accommodating users of varying heights. Notably, attachment of the Sun Tracking Visor is intended to not obstruct previously existing interior components of a vehicle, such as the rear-view mirror 10 and/or conventional sun visors 9 known in the prior art.

Figure 9:
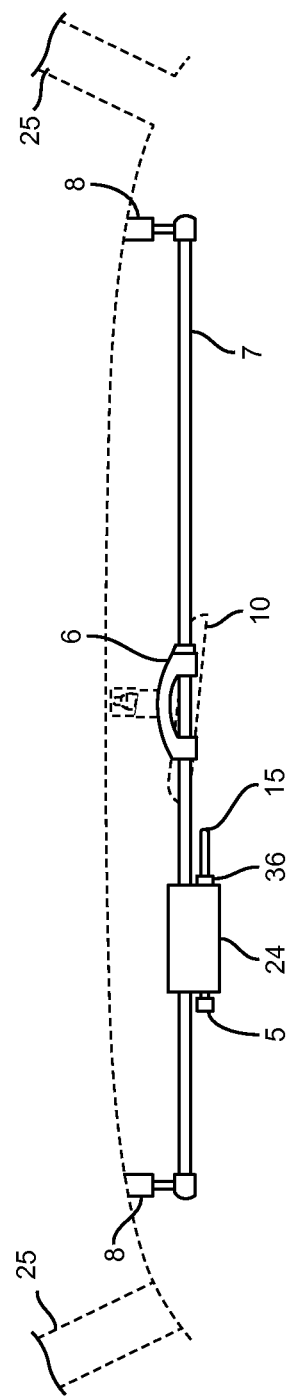
FIG. 9: Top-Down view of an embodiment of the invention.

In another embodiment of the invention, particularly for use with older vehicles lacking side air bags, in which the invention is acquired as an aftermarket addition, the invention is supported by direct attachment to the A-pillar 25 in the vehicle. The A-pillar 25, as it is commonly known, is the support structure horizontally adjacent to the windshield of a motor vehicle. In general, as illustrated in FIG. 1 and FIG. 9, the Track Rod Vehicle Mount 8 enables affixing the Sun Tracking Tint Visor to the interior of a vehicle.

Figure 8:
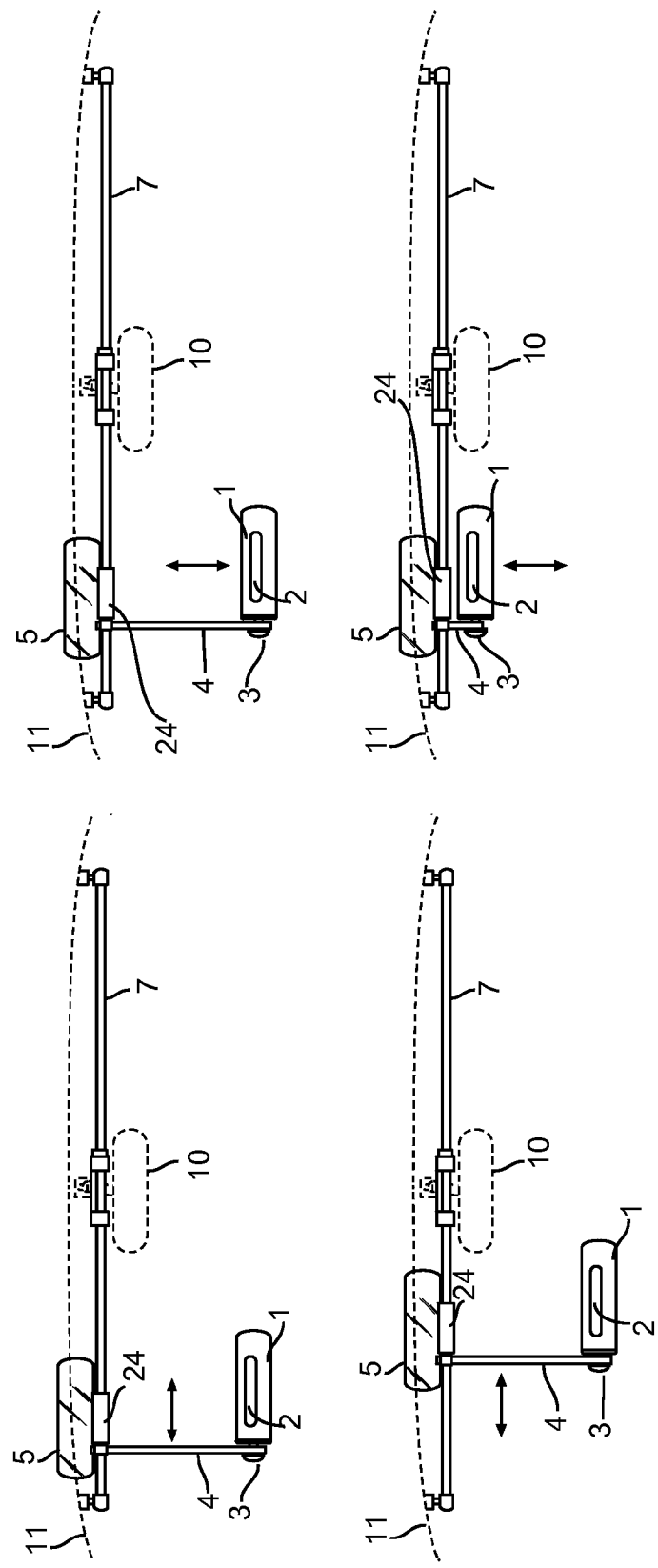
FIG. 8A: View of an embodiment of the invention in which the Darker Tint Strip is horizontally user-adjustable.
FIG. 8B: View of an embodiment of the invention in which the Darker Tint Strip is vertically user-adjustable.
Figure 10:
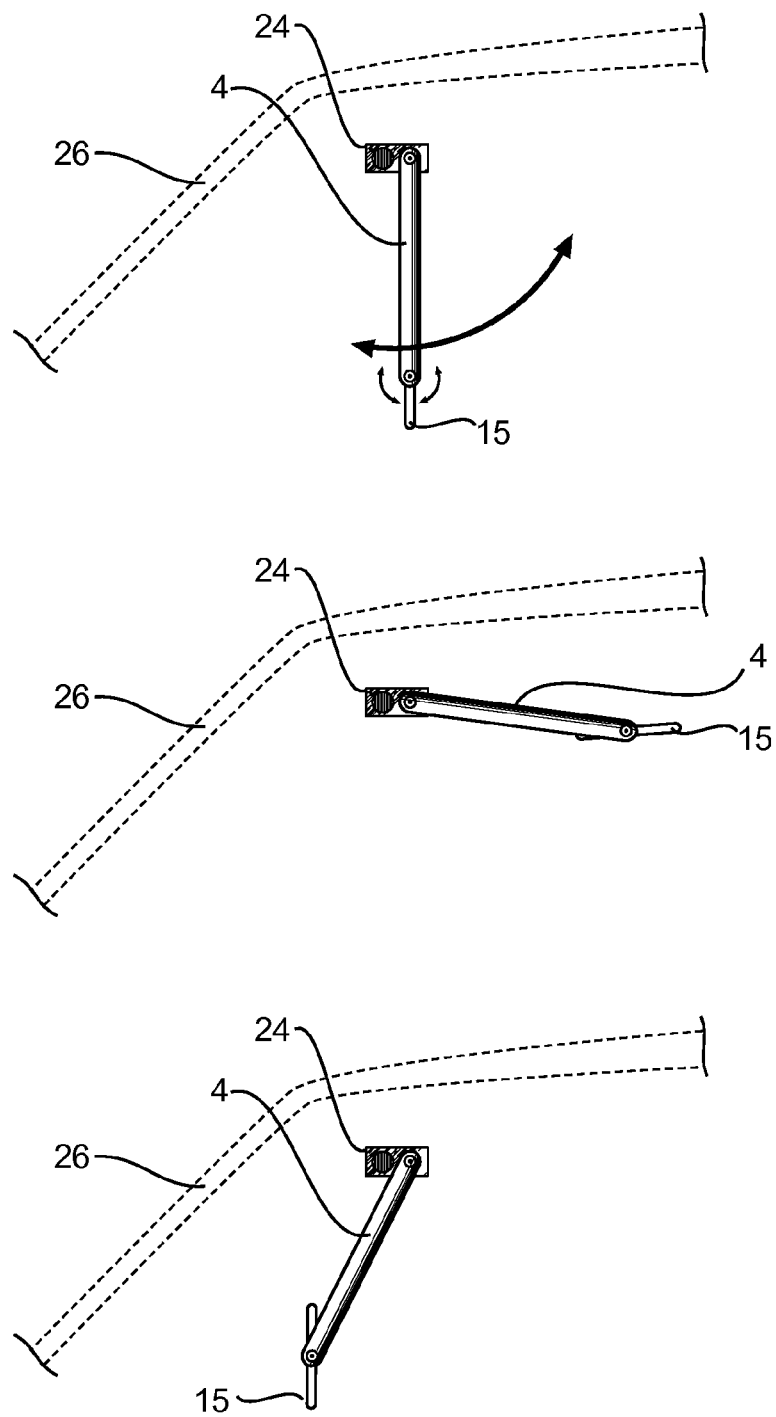
FIG. 10. Side view of an embodiment of the invention in which the Optical Filter and Darker Tint Strip move with the Track Rod.

In the preferred embodiment of the invention, the Sun-Tracking Tint Visor, comprising the Optical Filter 1 and Darker Tint Strip 2 protects the eyes of the driver or passenger from the sun from multiple angles. As illustrated in FIG. 8 and FIG. 10, but not limited to these depictions, the Sun-Tracking Tint Visor may move around in a multitude of directions to achieve the optimal positioning to partially impede the light emanating from the sun before it reaches the eyes of the user of the Sun-Tracking Tint Visor. The "Track Frame," as referred to herein, is a support structure component of the Sun-Tracking Tint Visor that enables user-directed mobility of the Optical Filter 1 and Darker Tint Strip 2 within the vehicle. As illustrated in FIG. 1, FIG. 8, and FIG. 9, one preferred embodiment of the track frame enables a user to move the Optical Filter 1 and Darker Tint Strip 2 in a number of directions. For instance, the preferred an embodiment of the Track Frame comprises a horizontal rod. Said rod, hereinafter referred to as a "Track Rod" 7, can be placed above existing structures found in cars, trucks, and/or other vehicles on land, air, sea, and space, such as a Rear-view Mirror 10, and will act as a support for the Optical Filter 1 and Darker Tint Strip 2 in the horizontal direction (as illustrated in FIG. 8A). In certain situations, The Track Rod 7 is secured to the Rear-view Mirror 10, preferably at the stem of said mirror, with a Mirror Mount Support Rod Locking Knob 6. In the preferred embodiment of the invention, Mirror Mount Support Rod Locking Knob 6 attachment mechanism comprises one or more clamps to secure the Track Rod 7 to the Rear-view Mirror 10. The Mirror Mount Support Rod Locking Knob 6 supports the Track Frame within the vehicle. In the preferred embodiment of the invention, the Mirror Mount Support Rod Locking Knob 6 also stabilizes the Track Rod 7, ensuring that said rod does not rotate. In the preferred embodiment of the invention, rotation of the Track Rod 7 is prevented by clamping down onto the Track Rod 7 through a chuck. The preferred embodiment of the Mirror Mount Support Rod Locking Knob 6 comprises a collet chuck further secured by an outer collar. In yet other embodiments of the invention wherein the cross-section of the Track Rod 7 is non-circular, a clamp that secures said non-circular cross section is utilized. In further embodiments of the invention, a hole that accommodates the non-circular cross-section of the Track Rod 7 prevents rotation of the Track Rod 7. Furthermore, the clamping mechanisms are also not limited to the above, and may further comprise of screws, springs, hooks, clasps, and other related attachment means.

Figure 16:
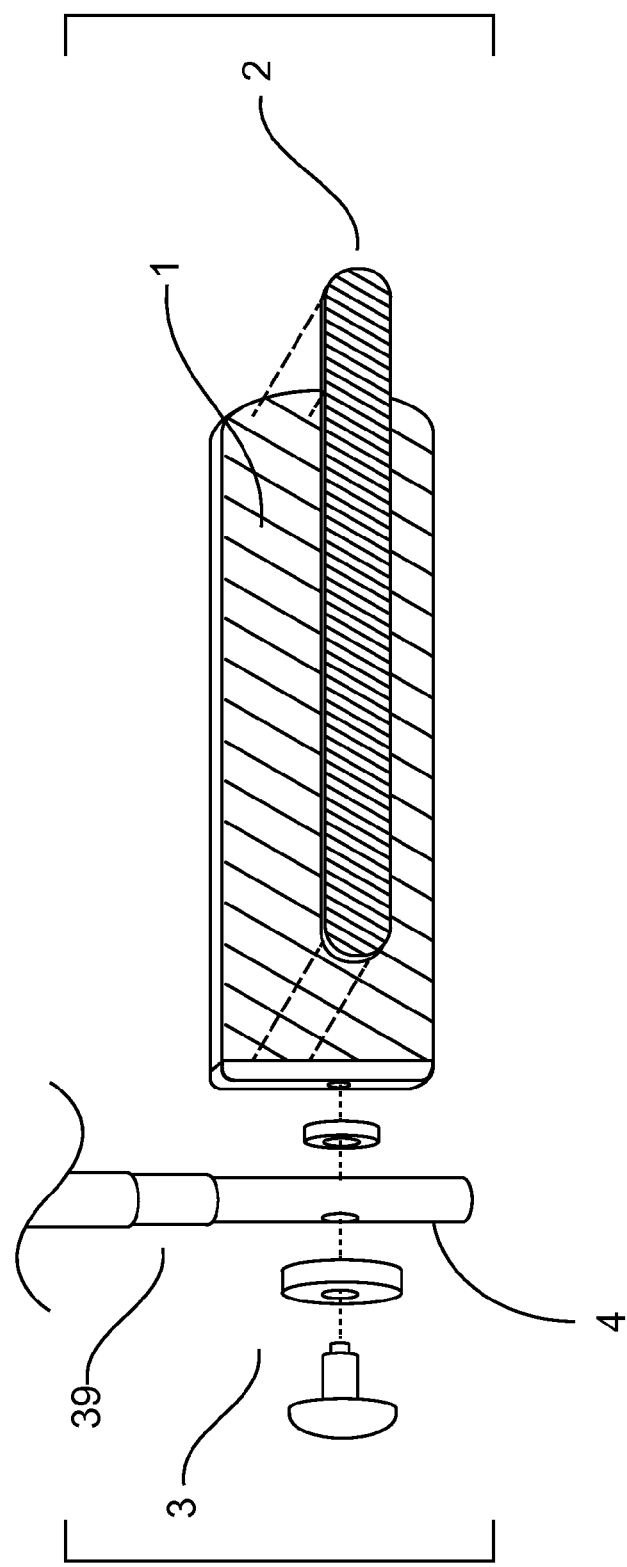
FIG. 16. Exploded view of an embodiment of Track Rod attachment to the Optical Filter, and Darker Tint Strip.

In addition, the user can move the Optical Filter 1 and Darker Tint Strip 2 in a general vertical direction, such as, for example, using an arm. Said arm, hereinafter referred to as "Track Arm" 4, is the attachment between the Optical Filter 1 and Darker Tint Strip 2 and the Track Rod 7. In the preferred embodiment of the invention, the Track Arm 4 will move the Optical Filter 1 and Darker Tint Strip 2 in the vertical direction (as illustrated in FIG. 8B). In addition, the Track Arm 4 will contain other components, including, but not limited to hinges, ball and socket joint, spring, piston, slides, etc. that afford the user of the Optical Filter 1 and Darker Tint Strip 2 mobility in a multitude of directions. For instance, the Optical Filter 1 and Darker Tint Strip 2 are secured to the Track Arm 4 by an Optical Filter Adjustment embodiment 3, as depicted in the embodiment in FIG. 16. In such specific embodiment, the Optical Filter Adjustment secures the Optical Filter 1 and Darker Tint Strip 2 to the Track Arm 4. The specific embodiment illustrated in FIG. 16 also comprises a Track Arm Telescoping assembly, wherein the user will further adjust the Optical Filter 1 and Darker Tint Strip 2 in the vertical direction.

In general, the user will be able to adjust the Optical Filter 1 and Darker Tint Strip 2 in the context of the Track Frame in a variety of directions including up and down, back and forth, side to side, and rotational and angled movement (pitch, yaw, and roll) with respect to the Track Rod 7, Track Arm 4 and/or the Optical Filter 1 and Darker Tint Strip 2 itself. The large degree of movement of the Optical Filter 1 and Darker Tint Strip 2 enables the user to position the Sun-Tracking Tint Visor as appropriate in response to a range of angles and intensities of the sun in the forward field of view of the operator of the vehicle. As the sun constantly moves in relation to the vantage point of the operator of a vehicle, the ability to reposition the Optical Filter 1 and Darker Tint Strip 2 is a critical feature of the preferred embodiment of the invention.

Figure 2:
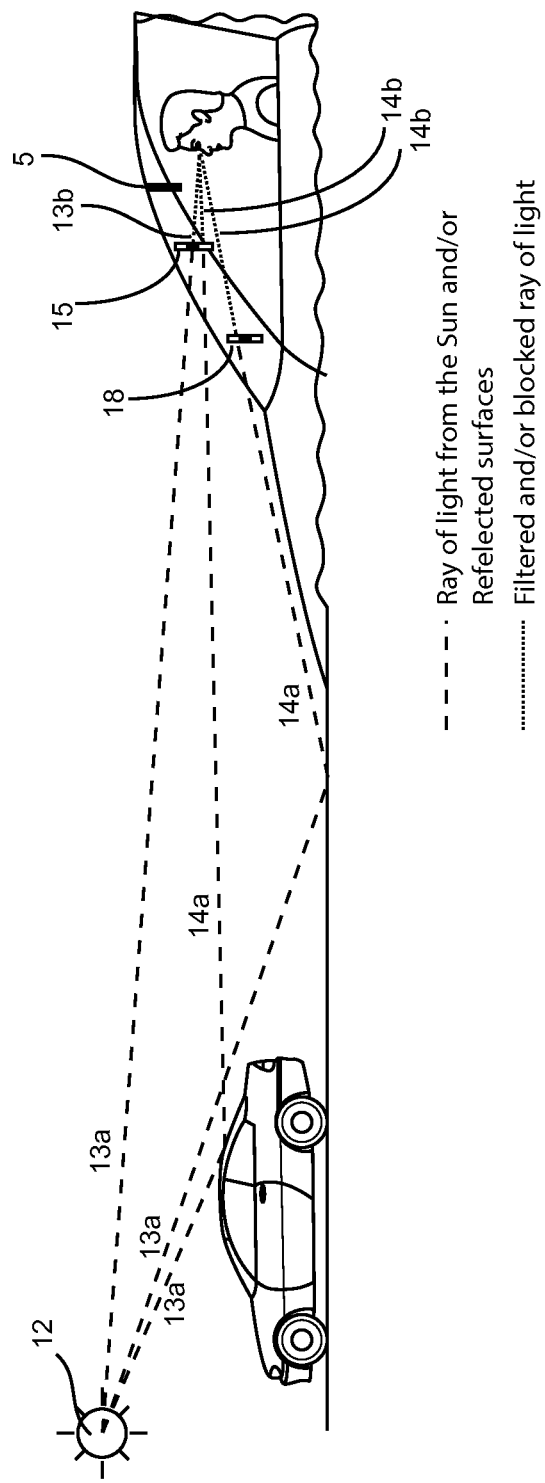
FIG. 2: Side view of a preferred embodiment of the invention in which an incident ray of Sunlight is at a low angle, such as during sunrise or sunset.

The ability to reposition the Optical Filter 1 and Darker Tint Strip 2 has advantages for many situations. As depicted in FIG. 2, a vehicle occupant using the Sun-Tracking Tint Visor provides additional benefit of reducing possible bright light associated with Sunlight, particularly at times when the sun 12 sits low in the sky near the horizon directly or close to directly in front of the driver of a vehicle. When the sun 12 is at a low level, the incident ray of light from the sun 13A can either directly enter the vehicle, or be reflected off various surfaces as a reflected ray of light 14A prior to entering the vehicle, thereby striking the occupant's eyes. Most importantly, oftentimes traditional prior art visors 9 are ineffective at a low sun level. The positioning of the Optical Filter and Darker Tint Strip assembly in front of the incident ray of light from the sun 13A and/or reflected ray of light 14A, will decrease the luminous transmittance of the light, resulting in the filtered incident ray of light from the sun 13B or filtered reflected ray of light 14B.

Figure 3:
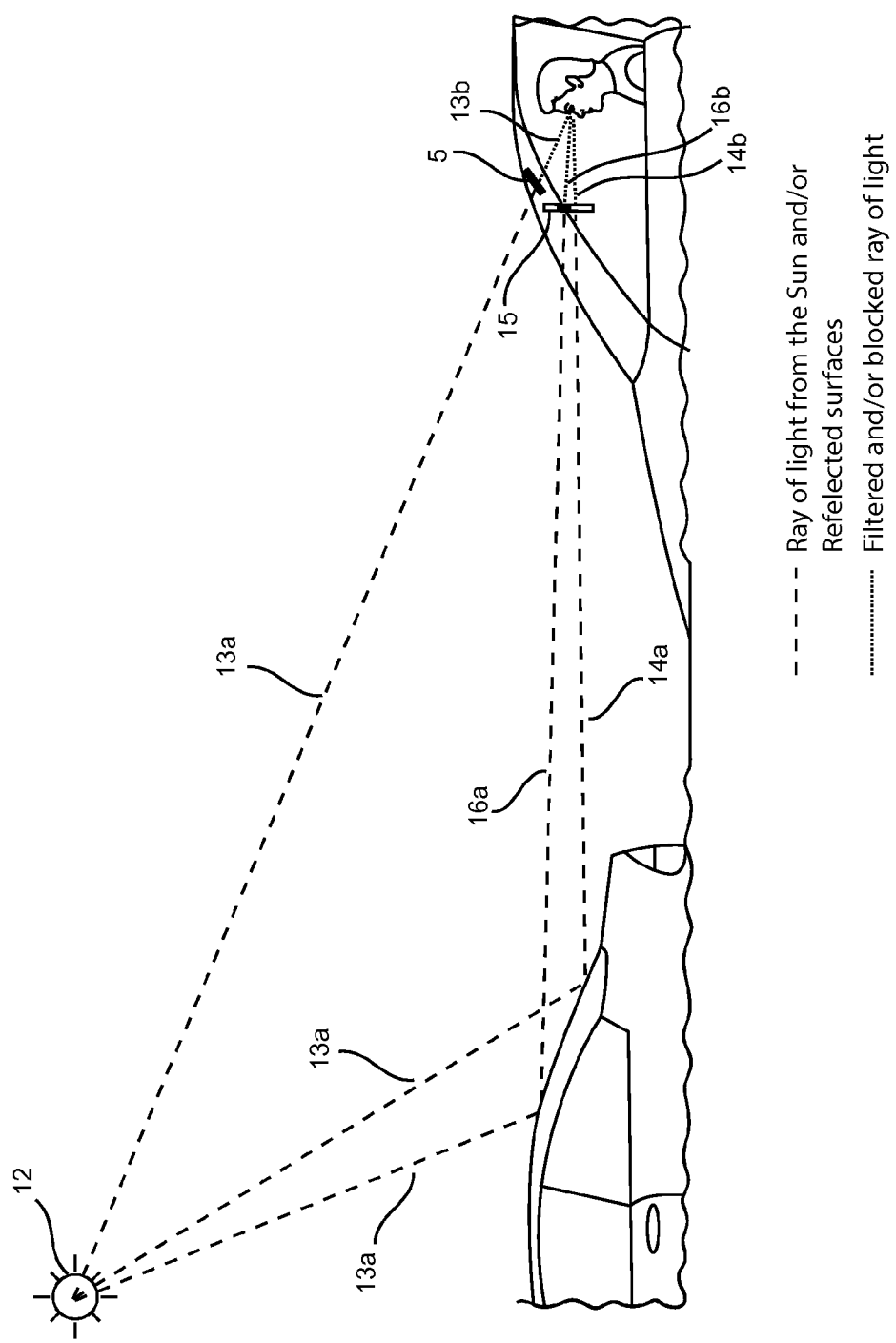
FIG. 3: Side view of a preferred embodiment of the invention in which an incident ray Sunlight is high with respect to a user.

In another situation, in which the sun 12 is at a high position relative to the horizon the present invention is also beneficial for a user. As depicted in FIG. 3, the Optical Filter and Darker Tint Strip assembly embodiment can be positioned in front of a user to filter out various rays of reflected light while using an Auxiliary Darker Visor Embodiment 5 to filter the ray of light 13B from other sources, such as the sun 12. Various surfaces can reflect the rays of light from the sun 12 in varying intensities. The user can utilize the preferred embodiment of the Optical Filter and Darker Tint Strip assembly to block these various rays of light. For instance, a reflected ray of light from a highly-reflective surface 16A, wherein said highly-reflective surface includes, for example, certain portions of another vehicle's windshield or metallic surface, can be filtered by the Darker Tint Strip 16B. At the same time, a reflected ray of light from another surface 14A, can be filtered by the Optical Filter. In other cases, such as for example, for users of above average stature, opaque visors 9 may reduce luminous transmittance to the point to totally or near-totally obstruct and reduce such users' visibility of the road. In such cases, said users of above average stature may choose to stow the current opaque visor and exclusively use the Sun Tracking Tint Visor.

Figure 4:
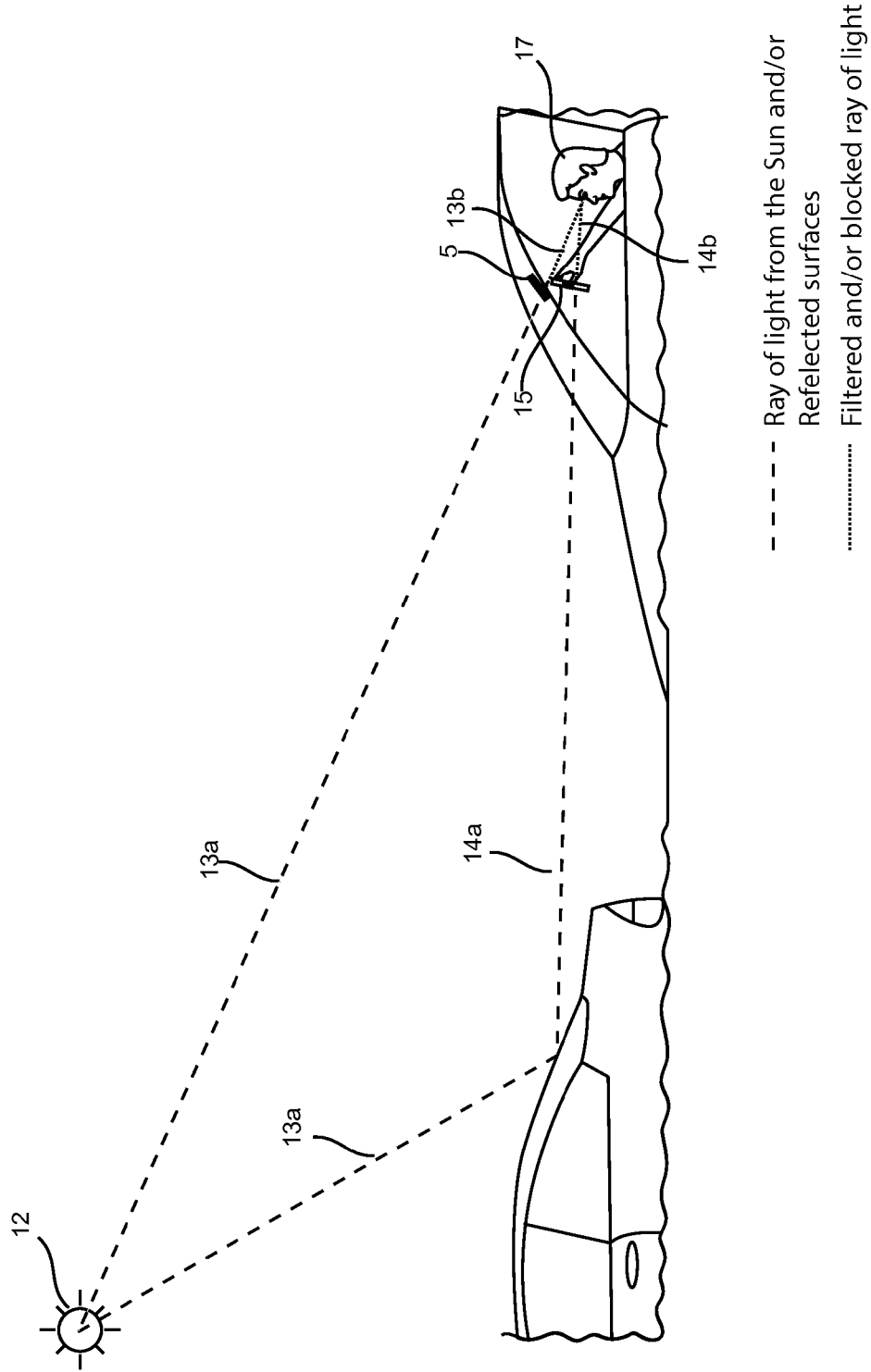
FIG. 4: Side view of a preferred embodiment of the invention in which an incident ray of Sunlight is high with respect to a user of below-average stature.

The scope of sunshine protection offered by prior art visors also is limited for some people of certain sizes and for some configurations of internal vehicular seating in relation to a windshield. For instance, many current visors block sunshine, whether direct or reflected, only for users of average or above average stature. In yet another situation, as depicted in FIG. 4, an embodiment of the present invention is beneficial for users unable to effectively utilize the prior art visor 9, such as for example, users of below-average stature 17. In such case, the wider range of mobility offered by the preferred embodiment of the Optical Filter 1 and Darker Tint Strip 2 assembly leads to increased accessibility. Such accessibility derives from the Track Frame, which enables users of below-average stature to position the Optical Filter 1 and Darker Tint Strip 2 to filter such bright light sources as the incident ray of light from the sun 13A and/or reflected ray of light 14A.

The preferred embodiment of the invention incorporates an Optical Filter 1 that maintains a level of transparency enabling a user to observe objects outside the vehicle with reduced light transmission. The preferred embodiment of the invention also enables the user to much more strongly lessen the brightness of the sun's direct rays through the Darker Tint Strip 2, which allows for only a minimal level of light transmissibility. In the preferred embodiment, the Darker Tint Strip 2 is so darkened to enable a user to safely look at the sun through the Darker Tint Strip 2 without causing harm to the user's eyes. The preferred embodiment of the invention, however, maintains a measurable level of transparency in both the Optical Filter 1 and the Darker Tint Strip 2.

In the preferred embodiment of the invention, the material of the Optical Filter 1 consists of CR-39, also known as allyl diglycol carbonate. However, still preferably, the Optical Filter 1 may otherwise or additionally comprise of acrylic sheet, glass, plexiglass, plastic, or a combination of materials. In the preferred embodiment of the invention, the tint is directly incorporated in the material used in the Optical Filter 1. In another embodiment of the invention, a layer of tinted adhesive is affixed to the Optical Filter 1 to introduce or augment the tint of the Optical Filter.

The darkness of a tinted material can be described by the percentage of light that can be detected passing through the material, or luminous transmittance. The ideal darkness for the functional region of this Optical Filter 1 allows between 0.5% and 20.0% luminous transmittance, corresponding to an American National Standards Institute (ANSI) shade number range of 3 to 4.

Figure 5:
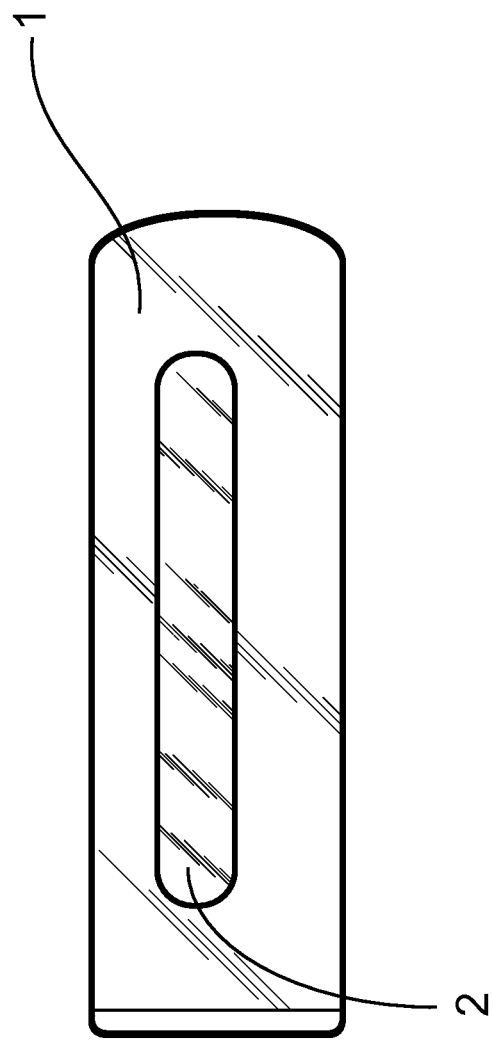
FIG. 5: An embodiment of the Optical Filter and Darker Tint Strip.

The preferred embodiment of the invention includes a region of the light-blocking device that is more heavily tinted to enable a user to directly look through said region into the sun in a safe manner. This region is referred to as a Darker Tint Strip 2. The Darker Tint Strip 2 is intended to have a very strong level of tinting, but not tinting to the point of where the Darker Tint Strip 2 is opaque. In the preferred embodiment, as illustrated in FIG. 5, the Darker Tint Strip 2 is centered within the area of the Optical Filter. In the preferred embodiment, the Darker Tint Strip 2 is built into the Optical Filter 1, as illustrated in a cross-sectional view of the Optical Filter 1 and the Darker Tint Strip 2 in FIG. 6A. In the preferred embodiment, the Darker Tint Strip 2 is generally much wider than it is tall in shape. In the preferred embodiment of the invention, each Optical Filter comprises of a single Darker Tint Strip 2. In the present invention, the Darker Tint Strip 2 will function to reduce light transmission from the sun to enable a user to safely look through the Darker Tint Strip 2 to see the sun.

The tinting level of the Darker Tint Strip 2 associated with the preferred embodiment of the present invention corresponds to the tinting level of a welding shield. Such level of very dark tinting blocks the sun sufficiently for safe viewing, but still allows a small amount of light to pass through the Darker Tint Strip 2. This configuration ensures that the user of the Sun-Tracking Tint Visor can reposition the body comprising the Optical Filter 1 and Darker Tint Strip 2 to precisely reflect the location relationship of the sun relative to said user and filter the sun's rays as appropriate before the sun's rays enter into the user's eyes.

Figures 6A, 6B:
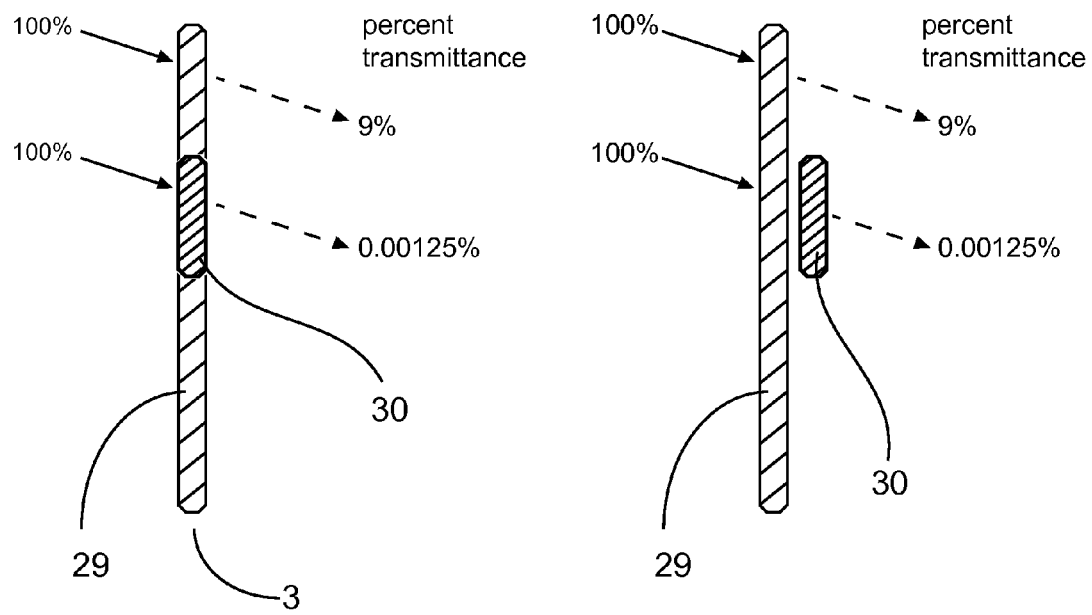
FIG. 6A: Side view of the preferred embodiment of the Optical Filter and Darker Tint Strip invention and preferred luminous transmittance through the apparatus.
FIG. 6B: Side view of an alternate embodiment of the Optical Filter and Darker Tint Strip invention and preferred luminous transmittance through the apparatus.

Referring to the American National Standards Institute (ANSI) standard, Z87.1 2010 for Practice for Occupational and Educational Eye and Face Protection for reference, in varying embodiments of the invention the Darker Tint Strip 2 reduces luminous transmittance to a range of 0.061% to 0.00027%, corresponding to an ANSI shade number of 9 to 14, with the preferred embodiment of the Darker Tint Strip 2 incorporating a luminous transmittance of approximately 0.00125% or corresponding to an ANSI shade number of 12 to 13. In varying embodiments, the Optical Filter, in contrast, will reduce the luminous transmittance to a range of 0.5% and 20.0%, with the preferred embodiment of the Optical Filter 1 reducing the luminous transmittance of incoming light to 9%, or corresponding to an ANSI shade number of 3 to 4. As illustrated in FIG. 6A, an embodiment of the invention reduces the luminous transmittance of incoming light to 9% within the Optical Filter area, and to 0.00125% within the Darker Tint Strip area.

Figure 6C:
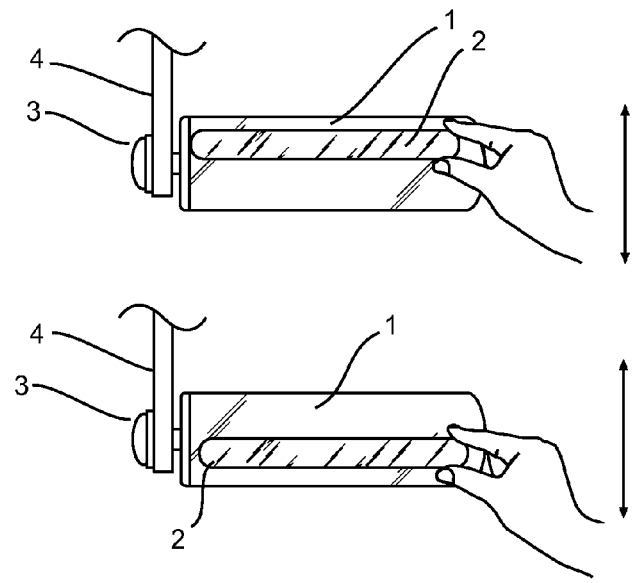
FIG. 6C: Frontal view of an alternative embodiment of the Darker Tint Strip moved across the Optical Filter.

In an embodiment of the invention, the Darker Tint Strip 2 may be moved horizontally and/or vertically within the Optical Filter, to enable sun tracking by the Darker Tint Strip 2 without the need for repositioning of the Optical Filter. In this embodiment, the Darker Tint Strip 2 will move along a track or tracks to enable horizontal and/or vertical movement of the Darker Tint Strip 2 independently from movement of the Optical Filter, as illustrated in FIG. 6C. The ease of moving the Darker Tint Strip 2 quickly within the Optical Filter in such embodiment, and the low luminous transmittance of the Darker Tint Strip 2, together will help the user to block Sunlight in a more effective manner in some circumstances. In embodiments wherein the Darker Tint Strip is movable within the Optical Filter, the combined luminous transmittance through both the Darker Tint Strip 2 and Optical Filter 1 will fall within a range of 0.061% and 0.00027%. In other words, as illustrated in FIG. 6B, an embodiment of the invention reduces the luminous transmittance of incoming light to 9% within the Optical Filter area, and to 0.00125% within the combined Darker Tint Strip and Optical Filter areas. Nonetheless, in the preferred embodiment of the invention, the Darker Tint Strip 2 is affixed to or built into the Optical Filter 1, as illustrated in FIG. 6A as a cross-sectional view of an embodiment of the invention. In this specific embodiment, instead of the user moving the Darker Tint Strip 2 within the Optical Filter, the user will simply move the Optical Filter 1 and Darker Tint Strip 2 in tandem to block the sun.

Referring to the illustrations in FIG. 2, FIG. 3, and FIG. 4, displaying a side view of embodiments of the invention, the ray of light filtered by the Optical Filter 14B is preferably filtered to a degree wherein the filtered ray falls within a range of 0.5% and 20.0% of the incoming ray of light. Moreover, the incident ray of light from the sun filtered by the Darker Tint Strip 13B or the Darker Auxiliary Visor 5, or the reflected ray of light from a highly-reflective surface filtered by the Darker Tint Strip 16B, are preferably filtered to a degree wherein the luminous transmittance is in a range of 0.061% and 0.00027% of the incoming ray of light. In the preferred embodiment of the invention, the Optical Filter reduces the luminous transmittance to 9%, and the Darker Tint Strip reduces the luminous transmittance to 0.00125%. In general, placement of the Optical Filter and Darker Tint Strip assembly in front of the user reduces the luminous transmittance of the incoming sunlight such that the user can navigate their surroundings. The preferred embodiment of the invention, comprising the various luminous transmittance, enables the user to decide which portion of the Optical Filter and/or Darker Tint Strip to block the many rays of light that may affect said user during operation of a vehicle.

The tinting levels employed by the embodiments of the present invention dramatically differ from tinting visors known in the prior art. Currently available light transmittance-reducing Darker Tint Strips 2 known in the prior art, such as the "Sunzapper" product (WO9919159A1), only reduces the transmittance to 4%. In a preferred embodiment of the present invention, the Darker Tint Strip 2 of said embodiment allows approximately 3200 times less light through than the prior art "Sunzapper" product. Therefore, in the preferred embodiment of the present invention, the Luminous Transmittance is dramatically reduced compared to the prior art. The Darker Tint Strip 2 in embodiments of the invention permit a maximum Luminous Transmittance of at most 0.061%.

One particular form of prior art sun blocking devices exists is the "Circular Sunspot." Circular sunspots in the prior art (U.S. Pat. Nos. 6,086,132; 4,003,597; U.S. D452,208) are designed to be attached to the visor or rearview mirror. Circular sunspots, however, sub-optimally block light from interfering with or causing annoyance to occupants of a vehicle. Because of their shape, they are able to effectively block the bright light from entering only one eye of a vehicle occupant at a time. The lack of protection from this prior art invention stems from human physiology, which dictates that people have two eyes located side by side.

The preferred embodiment of the present invention corrects such problems by employing a rectangular shape, more optimally comporting with human physiology by preventing light from entering not only primarily one eye of a user, but both eyes of the user more completely and simultaneously. This rectangular shape corresponds to the horizontally wide nature of human eyes. The Optical Filter 1, in the preferred embodiment of the invention, is an elongated device comprising of light-transmissible, tinted transparent material. As described above, the present inventor has discovered that a light-blocking device that is wider than it is tall, as depicted in the preferred embodiment in FIG. 7, is more likely to protect both eyes simultaneously than the less effective Circular Sunspots that exist in the prior art.

The present inventor has noted the importance of the contemplated wide shape in the tinted Darker Tint Strip 2 of the preferred embodiment of the invention, which is intended in particular to block sunlight. The present inventor has noted that when people utilize their hand to block sunshine, they do so by holding their hand in a generally horizontal fashion, generally parallel to the ground. Users of this technique generally do not, on the other hand, hold their hand vertically to block sunshine. This concept is reflected in the preferred embodiments of the Optical Filter 1 and Darker Tint Strip 2.

Figure 7:
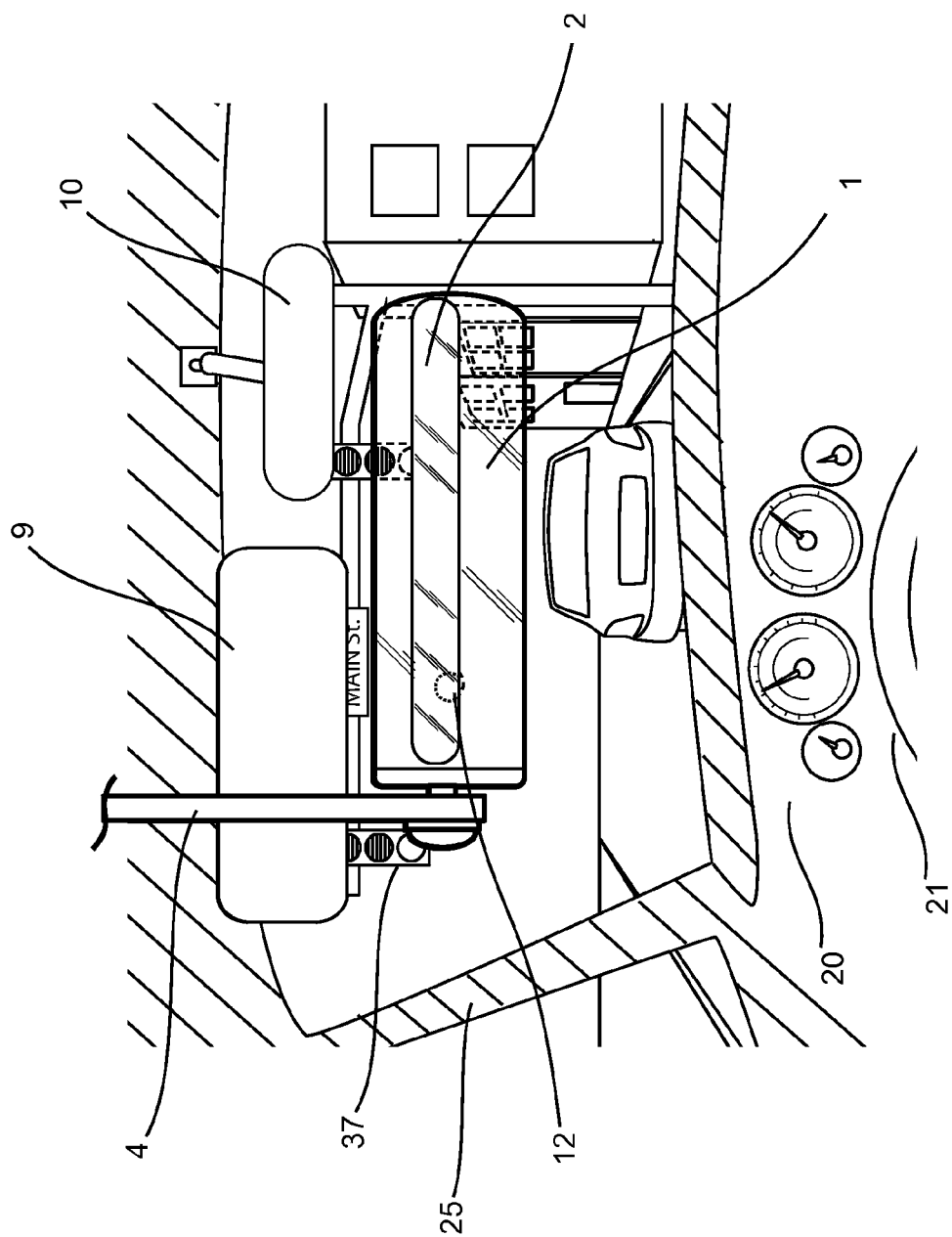
FIG. 7: The light filtering effect of the preferred embodiment of the invention from a vehicle occupant's perspective.

In the preferred embodiment of the invention, the Optical Filter 1 is primarily rectangular in shape, with rounded corners, and has a larger area in comparison to its corresponding Darker Tint Strip 2, as illustrated in FIG. 7. The primarily rectangular nature of the Optical Filter 1 and its Darker Tint Strip 2 in the preferred embodiment addresses the problems caused by the shapes of many sun blocking mechanisms known in the prior art, including U.S. Pat. Nos. 6,086,132; 4,003,597; U.S. D452,208. The shapes employed by such prior art inventions do not comport well with the shape of human physiology associated with eyesight.

The inventor has observed that the relative size of the Optical Filter 1 may differ with respect to the distance from the user or users to the windshield. In general, in the preferred embodiment the size of the Optical Filter 1 will be such that the user is able to move it freely in front and to the periphery of the user's view. This is to accommodate the varying potential locations of sun in relation to the eyes of the occupants of the vehicle while in motion. Embodiments of the Optical Filter 1 falls within a width range of 6 to 24 inches and a height range of approximately 3 to 8 inches. The preferred embodiment of the Optical Filter 1 is 9 inches wide and 4.5 inches tall. Embodiments of the Darker Tint Strip 2 falls within a width of 4-6 inches and a height range of ¾ inch to 2 inches. The preferred embodiment of the Darker Tint Strip 2 is 5 inches wide and 1.25 inches tall.

However, the present inventor has recognized that other sizes are applicable for various vehicle types or according to user preference. In other embodiments, larger Optical Filters and Darker Tint Strips are utilized for larger vehicles, such as for example, semi trucks with large windshields. In yet other embodiments, smaller Optical Filters and Darker Tint Strips are utilized for smaller vehicles, such as for example, compact cars. In addition, some users may prefer one embodiment of the invention over another with respect to sizes of the Optical Filter 1 and/or Darker Tint Strip 2. In such situations, the values for the dimensions of the embodiments of the Optical Filter or the Darker Tint Strip may fall outside of the ranges disclosed above. Ultimately, the emphasis of the present invention is placed on the characteristics that the Optical Filter 1, is in general, larger than the Darker Tint Strip 2, and the Optical Filter 1 and Darker Tint Strip 2, when considered together, is of a size to be reasonably repositioned together by a user within the context of a vehicle.

In varying embodiments of the invention, the Optical Filter 1 and/or Darker Tint Strip 2 may take on various forms not limited a specific shape or thickness, including, for example an elongated oval. In the preferred embodiment of the invention, though, the Optical Filter 1 will be rectangular with rounded corners. In such preferred embodiment, the Darker Tint Strip 2 is rectangular in shape and fully surrounded by the Optical Filter 1.

It was left to the present inventor to discover an unexpected benefit to the user when a very dark (but not opaque) material is used in a sun-blocking device. In a specific embodiment of the invention, the Darker Tint Strip 2 will reduce luminous transmittance from the sun to the driver or passenger to the extent that it no longer causes discomfort or Light Blindness when a user looks through said Darker Tint Strip 2 directly into the sun, while preserving the field of view through the less-tinted Optical Filter.

By looking at a possible front-facing perspective view, as in the from the viewpoint of a driver in a vehicle, the aforementioned tinting by the Darker Tint Strip 2 and the Optical Filter 1 can be more easily understood. As illustrated in an embodiment of the invention further illustrated by FIG. 7, the user will be able to heavily filter the Sun 12 using the Darker Tint Strip 2. The Darker Tint Strip, which follows the ANSI standards for luminous transmittance, will prevent the user from acquiring flash blindness from the Sun 12. Yet, the Darker Tint Strip 2 is not completely opaque. Therefore, in such instance, the user is able to prevent the sun from breaking past the edge of the Darker Tint Strip 2. This feature of the preferred embodiment of the invention enables the user to proactively avoid the hazards of Flash Blindness before they occur by enabling the driver to see the sun as a heavily dimmed light point through the Darker Tint Strip 2. By incorporating a very strongly tinted Darker Tint Strip 2, the preferred embodiment of the invention enables the user to always see the relative position of the sun and relocate the very strongly tinted area directly in the line of sight between the user and the sun. The user thereby avoids problems associated with prior art visors, whereby intentional or unintentional peering around the protected areas of a prior art visor leads to a user of a prior art visor looking directly into the sun (and suffering, for instance, Flash Blindness and associated problems), particularly during early morning and late afternoon periods.

The present inventor has also observed that the area of the Optical Filter 1 outside of the Darker Tint Strip 2 must have a substantially reduced tinting level to avoid the problems associated with opaque visors in the prior art described above, which prevent the driver from effectively seeing objects through the visor. In the preferred embodiment, the two-toned nature of the Sun-Tracking Tint Visor, incorporating both an Optical Filter 1 and smaller Darker Tint Strip 2, therefore, avoids this problem by incorporating multiple levels of luminous transmittance. The preferred embodiment incorporates a tint level in the area outside of the Darker Tint Strip 2 that empowers a user to comfortably view the roadway and other objects outside of the vehicle while still reducing the sun's rays from reaching users' eyes. As such, the present invention provides a benefit not available from devices in the prior art, namely, a dual shaded design that nearly completely prevents light from entering the super-darkened Darker Tint Strip 2 while preserving a full field of view for the user through the larger outer perimeter Optical Filter. Users will thus be able to see visual information, such as for example, signs, pedestrians, other vehicles, signals, roads, and as illustrated in FIG. 7, a Traffic Light 37 during the operation of the vehicle.

Together, the varying level of tint incorporated in the Optical Filter and Darker Tint Strip, and the ability to move and position the Sun-Tracking Tint Visor and Darker Tint Strip directly in the path of the light entering the car, enable users of the Sun-Tracking Tint Visor to see through the Optical Filter and Darker Tint Strip and adjust the location of the Optical Filter and Darker Tint Strip with respect to the sun as necessary to continue effective and safe operation of a vehicle. The interplay of the Darker Tint Strip 2 and the Optical Filter 1 in the preferred embodiment of the invention confers a number of added benefits to the user of the invention. While the area of the Optical Filter outside the Darker Tint Strip 2 may incorporate some level of tinting, the tinting in such area is much less than the Darker Tint Strip 2. The user can thereby maintain some protection from light entering through the entire embodiment and causing significant distraction, while still having a less obstructed view of the user's field of vision as compared to opaque visors of the prior art. While the Optical Filter 1 in the preferred embodiment of the invention is specifically not intended to be tinted to enable safe direct viewing of the sun, in such embodiment the Darker Tint Strip 2 is tinted to a level intended to dramatically reduce adverse effects of looking directly into the sun.

In other alternative embodiments of the present invention, all or part of materials that comprise the Optical Filter 1 and/or Darker Tint Strip 2 have characteristics beyond what is disclosed herein. In one embodiment of the invention, all or part of the materials that comprise the Optical Filter 1 are non-tinted or very lightly tinted, such that the view through the Optical Filter 1 is nearly completely unobstructed.

In another embodiment of the invention, the Optical Filter seamlessly and gradually transforms into the Darker Tint Strip through utilization of a gradient of tinting. Instead of having a distinct rectangular shape, the Darker Tint Strip gradually transforms into the Optical Filter. In such embodiment, there is no clear differentiation line between such Darker Tint Strip 2 and Optical Filter 1, so that the entire apparatus is one combined Darker Tint Strip 2/Optical Filter 1. However, in such embodiment the portion of the combined Darker Tint Strip 2/Optical Filter 1 near the center of the combined apparatus has a luminous transmittance level that falls within the corresponding ANSI Shade Number range of 9 to 14, and the portion of the combined Darker Tint Strip 2/Optical Filter 1 near the outer edge of the apparatus has a luminous transmittance level that falls within the corresponding ANSI Shade Number range of 3 to 7.

In another less-preferred embodiment of the invention, all or part of the materials that comprise the Optical Filter 1 and/or Darker Tint Strip 2 are translucent such that the view is diffused or distorted. In another embodiment of the invention, all or part of the materials that comprise the Optical Filter 1 and/or Darker Tint Strip 2 comprises a tint of one or more colors. In yet another embodiment of the invention, the Optical Filter 1 and/or Darker Tint Strip 2 comprises these and/or other various materials, such as for example those used for ultraviolet ray protection, and a combination thereof, that changes the view through the Optical Filter 1 and/or Darker Tint Strip 2 such that it is beneficial for the user when a bright light source is present.

Figure 13:
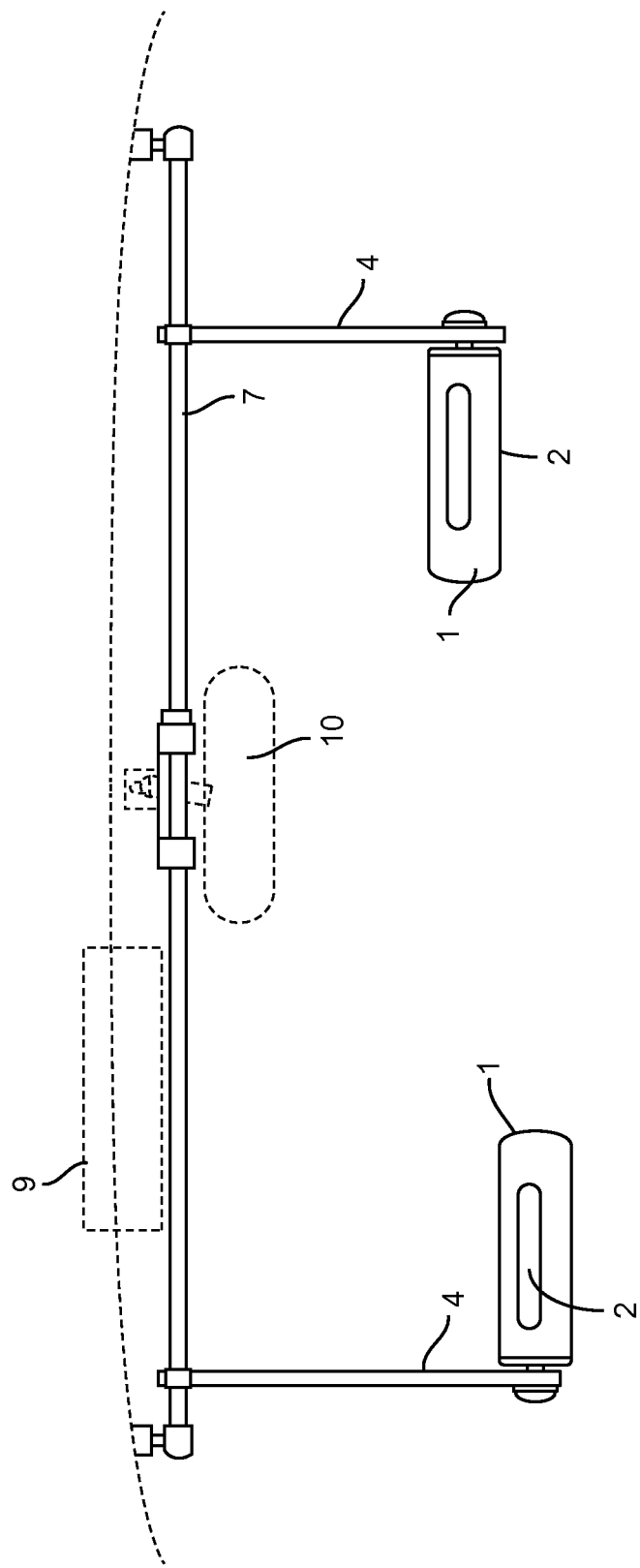
FIG. 13. An embodiment of the invention wherein more than one Optical Filter and Darker Tint Strip are affixed to a vehicle.

In another embodiment of the invention, multiple Optical Filters, Darker Tint Strips and Track Arms may be placed on the Track Rod 7 to accommodate more than one user, as illustrated in FIG. 13. For example, having two Optical Filters and Darker Tint Strips is beneficial to reduce the incidence of Light Blindness and discomfort for both the driver and the passenger in a typical passenger vehicle, when one Optical Filter/Darker Tint Strip combination is placed on the driver side of the vehicle and another on the passenger side of the vehicle. The inventor recognizes that there are cases in which more than one Optical Filter 1 and/or Darker Tint Strip 2 will be necessary to accommodate the multitude of users that may be affected by sunlight.

In addition to the user-movable aspects described above, the inventor has recognized the importance of the Optical Filter 1 and Darker Tint Strip 2 moving automatically. "Manual" or "manually," in this case, refers to the conscious decision making of the user to make adjustments. "Automatic" or "automatically," in this case, refers to a processor-assisted adjustment that is associated with the device or devices. For some users, especially users of below-average stature or limited mobility, it is advantageous for the Optical Filter 1 and the Darker Tint Strip 2 to move automatically. In an embodiment of the invention, a sensor-based sunlight detector associated with a processor and series of motors adjust the Optical Filter 1 and the Darker Tint Strip 2 to intercept the sunlight before it travels from the sun into the user's eyes. In this way, automatic adjustments of the Optical Filter 1 and the Darker Tint Strip 2 may assist users who are unable to interact with the Optical Filter 1 and Darker Tint Strip 2. In other embodiments, the Optical Filter 1 and the Darker Tint Strip 2 may be adjusted by wired or wireless control, or though voice-activation.

The method of mounting a Optical Filter 1 and Darker Tint Strip 2 to a vehicle factors highly into the ultimate movability of the preferred embodiment. The preferred embodiment of the present invention uses two vehicle attachment points for the preferred embodiment's guide frame. In an embodiment of the invention, one attachment point is fixed on the center windshield, near the mirror stem. In another embodiment, the attachment points 8 are integrated directly into the metal chassis of the frame, as illustrated in FIG. 1 and FIG. 9.

In the preferred embodiment of the invention, the horizontal movement of the Optical Filter 1 and Darker Tint Strip 2 is accomplished by a Sliding Carriage Box 24. In one embodiment of the Sliding Carriage Box 24, the box slides across the Track Rod 7 in the horizontal direction. The Track Rod 7 is in general longer than it is thick, and the cross sectional shape 28 may take the form of a variety of shapes and/or sizes, such as, for example, and not limited to, a polygon, circle, or sector. In one specific embodiment, the Track Rod 7 is a non-circular cylinder, wherein the cross-section 28 of said Track Rod 7 is a sector. In this specific embodiment, a Track Rod Securement Plate 34 attaches within the Sliding Carriage Box housing and secures the Track Rod 7 by preventing the Sliding Carriage Box 24 from pivoting, thus enabling horizontal movement of the Sliding Carriage Box assembly along the Track Rod 7 while preventing twisting around said Track Rod 7.

Figure 11A:
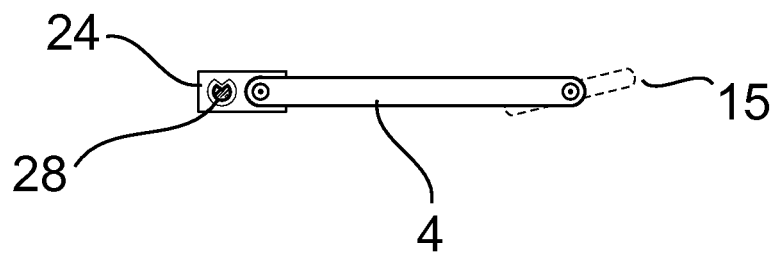
FIG. 11A: Side view of an embodiment of the invention in which the Optical Filter and Darker Tint Strip are raised for storage.
Figure 11B:
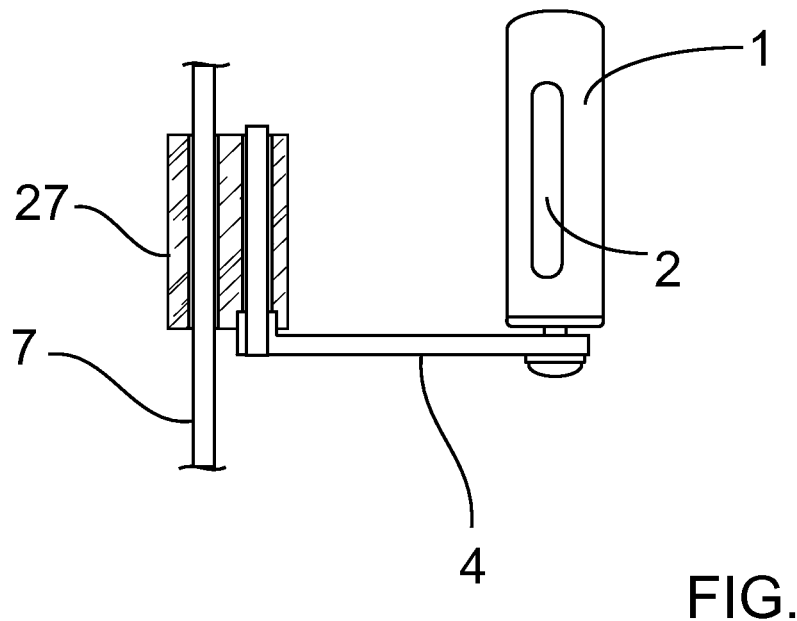
FIG. 11B: Top-down view of an embodiment of the invention in which the Optical Filter and Darker Tint Strip are raised for storage.
Figure 12:
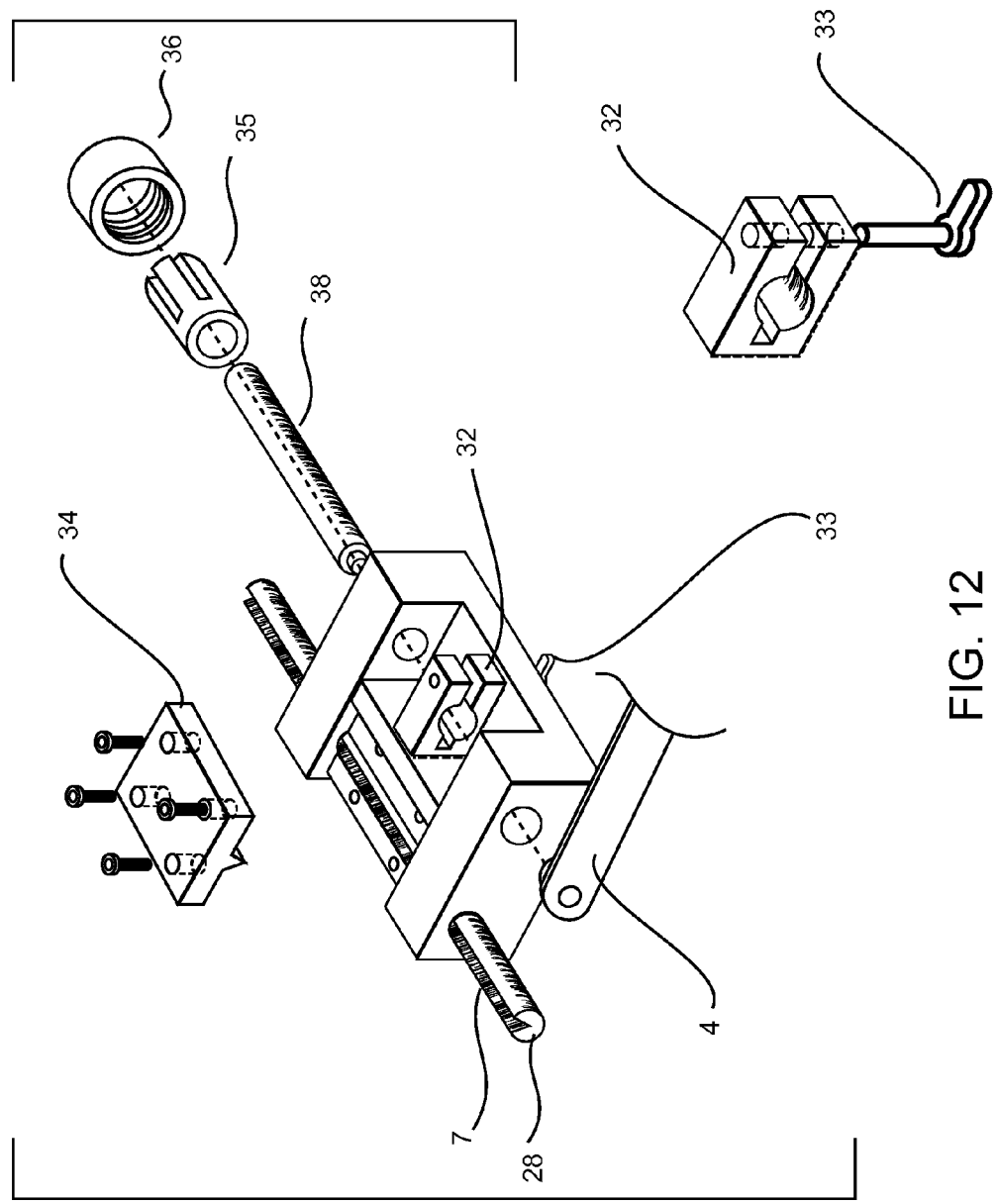
FIG. 12. Three-quarters, exploded view of an embodiment of the Sliding Carriage Box.

The Siding Carriage Box 24, in addition to sliding on the Track Rod 7, comprises an attachment point with the Track Arm 4. The Track Arm 4 is able to move in a variety of directions from the Sliding Carriage Box 24, as illustrated in one embodiment in FIG. 11B. The Sliding Carriage Box 27 attaches to both the Track Rod 7 and the Track Arm 4. In one specific embodiment, as illustrated in FIG. 12, the Track Arm attaches to the Sliding Carriage Box 24 with a Sliding Carriage Box Spindle 37, and secured to the Carriage Box with a Sliding Carriage Box Track Arm Bearing 32 and Sliding Carriage Box Track Arm Fastener 33. In addition, this embodiment of the Sliding Carriage Box also comprises a Sliding Carriage Box Clamp Assembly 32 that secures the Sliding Carriage Box Spindle 37 with a Sliding Carriage Box Fastener, 33, thereby enabling the user to adjust the angle of the Track Rod. By securing said spindle to the Sliding Carriage Box, in one specific embodiment of the invention, the Track Arm 4 can be pivoted a variety of angles, as illustrated in the side view of the invention within a vehicle shown in FIG. 10. Also illustrated in the embodiment in FIG. 10, the Optical Filter and the Darker Tint Strip may pivot independently on the Track Arm 4 from the Track Arm 4 on the Sliding Carriage Box 24, enabling the user to stow the Optical Filter and the Darker Tint Strip 15 flush with the ceiling of the vehicle, as represented by the top portion of the cross-sectional view of the vehicle 26 in FIG. 10, and further illustrated in FIG. 11A and FIG. 11B.

While the Sliding Carriage Box is one embodiment of enabling movement of the Optical Filter and the Darker Tint Strip, the inventor has recognized that other embodiments are possible to enable movement of the Optical Filter and the Darker Tint Strip within the Track Frame.

From the Sliding Carriage Box, the Optical Filter and the Darker Tint Strip are attached to the Track Arm 4. As illustrated in an embodiment in FIG. 16, The Optical Filter is affixed to the Track Arm 4 and can swivel in multiple directions from its attachment point via the Optical Filter Adjustment 3. In addition, in one embodiment of the invention, the Track Arm 4 is capable of telescoping 39. In other embodiments, the Track Arm 4 may have the capability for pivoting or shifting in such a way that the arm can be shortened and lengthened as desired. By using this method of mounting in the preferred embodiment, the present inventor has discovered that the Optical Filter is available to block sun in virtually all parts of the driver's view.

In addition, the inventor has recognized that the resistance force to move the Sun-Tracking Tint Visor is an important component of the preferred embodiment of the present invention. Such resistance force is needed to ensure that the Optical Filter 1, Darker Tint Strip 2, Track Rod 7, Track Arm 4, and/or other moving components comprising the preferred embodiment of the invention do not unintentionally move during acceleration, deceleration, and turning. In an embodiment, the hinges, ball and socket joint, spring, piston, slides, cables, pulleys, belts and/or other components that afford movement of the Optical Filter 1 and/or Darker Tint Strip 2 can be user-tightened with, such as for example, a clamp and/or tightening screw mechanism. Said tightening screw mechanism may be user-adjusted and/or spring-loaded. Such said user-adjusted tightening mechanism is represented in an illustration in FIG. 12 showing an embodiment of the Sliding Carriage Box. The Sliding Carriage Box embodiment 24 enables movement of the Optical Filter 1 and Darker Tint Strip 2 along the Track Rod 7 in a horizontal direction. The Sliding Carriage Box Track Arm Clamp Assembly 32, and the Clamp Fastener 33 embodiments secures the Track Arm 4, further enabling movement of the Optical Filter 1 and Darker Tint Strip 2 in various angles, as illustrated in an embodiment in FIG. 10. In other embodiments, the mobility of said components are regulated by a balanced arm comprising one or more springs and/or one or more counterweights.

Figure 14:
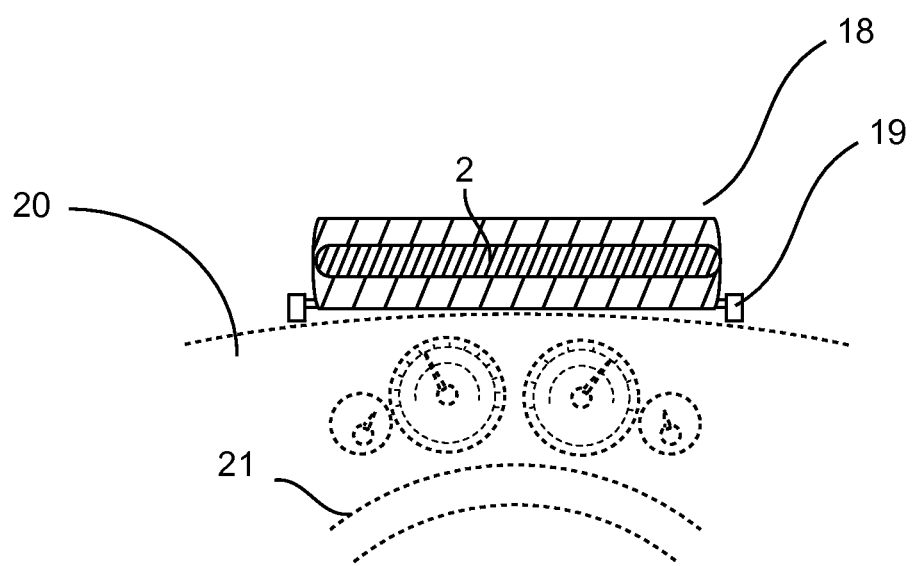
FIG. 14. An embodiment of the invention wherein more than one Optical Filter and/or Darker Tint Strip affixed to a vehicle.

In an embodiment of the invention, a second Auxiliary Optical Filter and Darker Tint Strip Assembly 18 is mounted near the dashboard 20, using an Optical Filter Mount embodiment 19, in conjunction with a primary Optical Filter and Darker Tint Strip in the positioning associated with the preferred embodiment of the invention as described herein. The second Auxiliary Optical Filter and Darker Tint Strip Assembly 18, as illustrated by FIG. 14, operates to block reflected light traveling into the line of sight of a vehicle occupant from below. For instance, the second Auxiliary Optical Filter and Darker Tint Strip Assembly 18 embodiment may block light reflecting off of the ground, such as for example off of wet pavement, or reflecting off of portions of other vehicles, as illustrated in FIG. 2. The use of the second Auxiliary Optical Filter and Darker Tint Strip Assembly 18 embodiment would not be limited to one type of vehicle, for example, in the case of a user of a larger truck that has a vantage point at an elevated level, wherein the user of said Auxiliary Optical Filter and Darker Tint Strip Assembly 18 embodiment may benefit from filtering out bright reflected light from a whole range of reflective surfaces located at a lower level. The second Auxiliary Optical Filter and Darker Tint Strip Assembly 18 embodiment would comprise similar tinted transparent and light-transmissible materials and similarly incorporate the Optical Filter 1 and Darker Tint Strip 2 like the preferred embodiment of the invention described herein.

Moreover, a third auxiliary piece is highly beneficial for blocking the sun's rays. The "Auxiliary Darker Visor," as referred to herein, is an additional component of the Sun-Tracking Tint Visor that further blocks the sun's rays from other angles. Referring to the ANSI standard, Z87.1 2010, the Auxiliary Tint Visor 5 reduces luminous transmittance to a range of 0.061% to 0.00027%, corresponding to an ANSI shade number of 10 to 14, with the preferred embodiment of the Auxiliary Tint Visor 5 incorporating a luminous transmittance of approximately 0.00125% or corresponding to an ANSI shade number of 12 to 13.

In the preferred embodiment of the invention, as illustrated in FIG. 1, the Auxiliary Darker Visor 5 attaches to the Track Frame. As illustrated in FIG. 3, the side view of the Auxiliary Darker Visor 5 shields the sun's rays 13a when the sun is located at a high position, while simultaneously, the Optical Filter and Darker Tint Strip 15 block the glare associated with reflected light from a surface. In this way, the Auxiliary Darker Visor 5 provides additional protection for the user's or users' eyes during the operation of a vehicle.

An embodiment of the invention incorporates electronic light dimming mechanisms. The Sun Lens in this embodiment may comprise electrochromic, photochromic, thermochromic, suspended particle, micro-blind, liquid crystal devices or similar "smart glass" mechanisms to adjust the luminous transmittance of the Darker Tint Strip 2 and/or the area of the Optical Filter outside the Darker Tint Strip 2. An embodiment of the invention may incorporate known auto-darkening welding helmet technologies, with continuously variable controls that adjust the shade from a light state to a dark one and back. Such technologies protect a user from harmful light emissions at all times. Such technologies enable the Optical Filter 1 and the Darker Tint Strip 2 to darken to the desired ANSI Shade Number levels, described herein, in milliseconds by incorporating a quick-changing LCD (Liquid Crystal Display) technology in auto-darkening cartridges. By incorporating such technologies, the Sun-Tracking Tint Visor can make continuous adjustment to the light transmittance, reducing the need to reposition the apparatus.

An embodiment of the invention may incorporate an adhesive privacy film to achieve the desired tint levels described herein in the Optical Filter 1 and Darker Tint Strip 2. Some such privacy films may be applied in the form of coatings to the Optical Filter 1 and Darker Tint Strip 2. Other varying embodiments of the present invention may incorporate coatings or film that enable tint change control automatically or manually by the user via a variety of control mechanisms known in the prior art to control the luminous transmittance of various smart glass applications. Such embodiment of the invention may incorporate a Polymer Dispersed Liquid Crystal (PDLC) film sandwiched between two layers of glass and two layers of conductive interlayers. The PDLC film enables the Optical Filter 1 and Darker Tint Strip 2 to change their visual appearance from a higher tint level to a lesser tint level. These and similar technologies will automatically cause the Optical Filter 1 and Darker Tint Strip 2 to darken to the desired shading levels.

Figure 15:
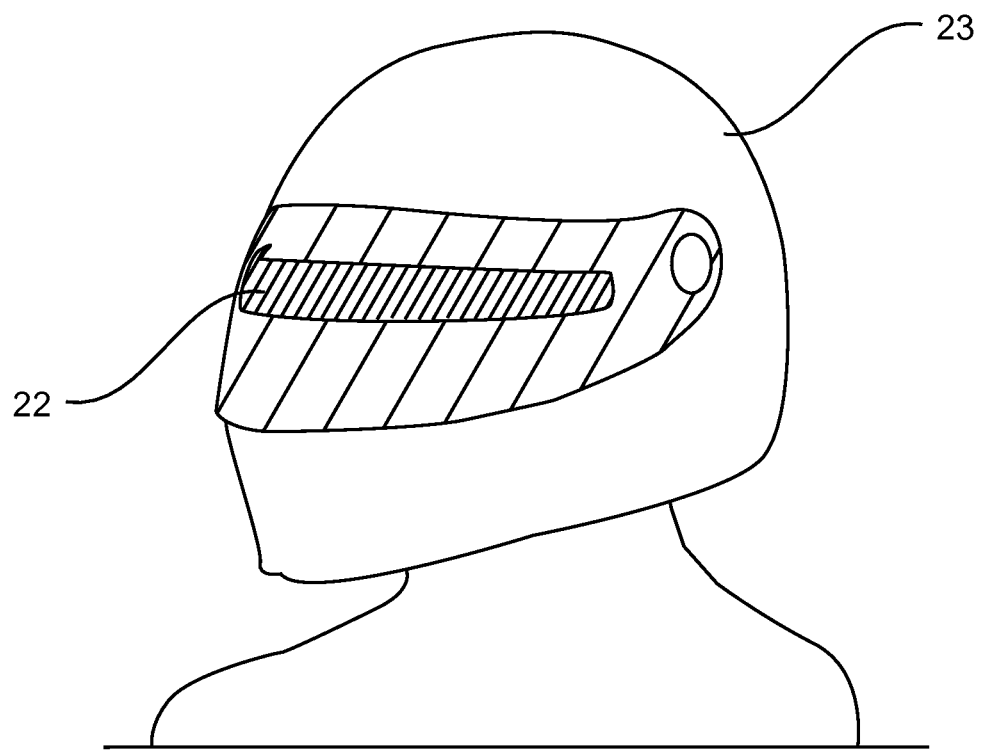
FIG. 15. An embodiment of the invention wherein the Optical Filter and/or Darker Tint Strip are utilized in a helmet.

An additional embodiment includes incorporation of the Darker Tint Strip into other types of visors. An example of a situation where the Darker Tint Strip 22 would be beneficial to the user is in the case of a visor located on a helmet 23 for motorcyclists, as illustrated in FIG. 15. In such a case, said Darker Tint Strip for a Helmet Embodiment 22 will be adjusted manually, or will be motorized and controlled by the user without having to let go of the handles required for steering. In such embodiment, the location of the Darker Tint Strip 22 relative to the visor is controlled manually or automatically. Manual adjustments of the Darker Tint Strip 22 may be performed by simply moving said Darker Tint Strip or occur through wired or wireless control from switches located near the user's fingers, or though voice-activation. Automatic adjustments of the Darker Tint Strip 22 includes a sensor-based detection of a bright light source such as the sun, and a processor based adjustment of said Darker Tint Strip 22 relative to the user's eyes.

In additional embodiments of the invention, the Optical Filter 1 and Darker Tint Strip 2 may be tailored to address the bright lights of oncoming traffic and other bright lights encountered on the roadway at night. Flash Blindness may also occur when bright light originates from oncoming traffic or other extravehicular objects, such as construction lights commonly employed late at night on American highways, partially or totally impairing the vision of a driver by causing Flash Blindness. In such a situation an alternative embodiment of the invention may enable positioning to more specifically address headlights and other man-made lights occurring during nighttime.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 20%, in another embodiment within 15%, in another embodiment within 10%, in another embodiment within 5%, in another embodiment within 1% and in another embodiment within 0.5%. The terms "coupled" and "linked" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

I claim:

1. A light filtering apparatus comprising:
a visor having a shape with a width greater than its height;
said visor comprising a material that allows the passage of light;
a darker tinted portion attached to said visor, wherein said darker tinted portion allows less light to pass than the other portions of said visor, wherein said darker tinted portion comprises a tint that allows between 0.00027% and 0.061% luminous transmittance;
said darker tinted portion having a horizontal width that is substantially the same width as the visor and a vertical height less than the height of the visor;
said darker tinted portion being located between the upper edge and the lower edge of the visor; and
said visor being moveably mounted to a vehicle using a frame.

2. A light filtering apparatus comprising:
a visor having a shape with a width greater than its height;
said visor comprising a material that allows the passage of light;
a darker tinted portion attached to said visor, wherein said darker tinted portion allows less light to pass than the other portions of said visor;
said darker tinted portion having a horizontal width that is substantially the same width as the visor and a vertical height less than the height of the visor;
said darker tinted portion being located between the upper edge and the lower edge of the visor;
said visor being moveably mounted to a vehicle using a frame;
a second visor comprising a material that decreases light transmission;
said second visor further comprises a darker tinted portion, wherein said darker tinted portion allows less light to pass than other portions of said visor;
wherein said second visor comprises a material that allows between 0.00027% and 0.061% luminous transmittance.

3. An apparatus to block sunlight to eliminate user impairment while preserving the user's field of view comprising:
a visor comprising material having a luminous transmittance of 9%;
a portion of said visor having a smaller area comprising a material having a luminous transmittance of 0.00125%, wherein said apparatus is moveably mounted to a vehicle.

4. The apparatus of claim 3, wherein said apparatus is moveably mounted to move and rotate in multiple dimensions.

* * * * *